(12) United States Patent
Lee

(10) Patent No.: US 11,700,398 B2
(45) Date of Patent: *Jul. 11, 2023

(54) METHOD AND APPARATUS FOR ENTROPY-ENCODING AND ENTROPY-DECODING VIDEO SIGNAL

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

This patent is subject to a terminal disclaimer.

(21) Appl. No.: 17/357,032

(22) Filed: Jun. 24, 2021

(65) Prior Publication Data

US 2021/0385505 A1 Dec. 9, 2021

Related U.S. Application Data

(63) Continuation of application No. 16/645,400, filed as application No. PCT/KR2018/013489 on Nov. 7, 2018, now Pat. No. 11,082,721.

(Continued)

(51) Int. Cl.
*H04N 19/91* (2014.01)
*H04N 19/139* (2014.01)
(Continued)

(52) U.S. Cl.
CPC ........... *H04N 19/91* (2014.11); *H04N 19/139* (2014.11); *H04N 19/176* (2014.11); *H04N 19/46* (2014.11); *H04N 19/51* (2014.11); *H04N 19/70* (2014.11)

(58) Field of Classification Search
None
See application file for complete search history.

(56) References Cited

U.S. PATENT DOCUMENTS 10,448,010 B2 10/2019 Chen et al.
10,560,712 B2 2/2020 Zou et al.
(Continued)

FOREIGN PATENT DOCUMENTS

WO WO2017022973 2/2017
WO WO2017118411 7/2017

OTHER PUBLICATIONS

Chen et al., "Algorithm Description of Joint Exploration Test Model 3," JVET-C1001_v3, Joint Video Exploration Team (JVET) of ITU-T SG 16 WP 3 and ISO/IEC JTC 1/SC 29/WG 11, Geneva, CH, dated May 26-Jun. 1, 2016, 37 pages.

(Continued)

*Primary Examiner* — Reza Aghevli
(74) *Attorney, Agent, or Firm* — Fish & Richardson P.C.

(57) ABSTRACT

The present invention relates to a method for performing entropy decoding on a video signal including a current block. The method comprises the steps of: deriving affine coding information and/or affine prediction mode information of a left block and/or an upper block which are adjacent to the current block; determining a context index of a syntax element associated with an affine prediction of the current block on the basis of at least one of the affine coding information and/or the affine prediction mode information of the left block and/or the upper block; and entropy decoding the syntax element associated with the affine prediction of the current block on the basis of the context index.

9 Claims, 22 Drawing Sheets

Related U.S. Application Data

(60) Provisional application No. 62/646,891, filed on Mar. 22, 2018, provisional application No. 62/555,053, filed on Sep. 7, 2017.

(51) Int. Cl.
*H04N 19/176* (2014.01)
*H04N 19/46* (2014.01)
*H04N 19/51* (2014.01)
*H04N 19/70* (2014.01)

(56) References Cited

U.S. PATENT DOCUMENTS

| | | | |
|---|---|---|---|
| 10,638,152 B2 | 4/2020 | Chuang et al. | |
| 10,681,370 B2 | 6/2020 | Chen et al. | |
| 11,082,721 B2* | 8/2021 | Lee | H04N 19/176 |
| 2013/0003827 A1 | 1/2013 | Misra et al. | |
| 2017/0332095 A1* | 11/2017 | Zou | H04N 19/124 |
| 2018/0098063 A1* | 4/2018 | Chen | H04N 19/176 |
| 2018/0192047 A1 | 7/2018 | Lv et al. | |
| 2018/0192069 A1* | 7/2018 | Chen | H04N 19/176 |
| 2019/0028731 A1* | 1/2019 | Chuang | H04N 19/159 |
| 2019/0058896 A1* | 2/2019 | Huang | H04N 19/159 |
| 2019/0082191 A1* | 3/2019 | Chuang | H04N 19/513 |
| 2019/0110064 A1* | 4/2019 | Zhang | H04N 19/54 |
| 2019/0364295 A1* | 11/2019 | Li | H04N 19/54 |
| 2020/0021814 A1 | 1/2020 | Xu et al. | |
| 2020/0045310 A1 | 2/2020 | Chen et al. | |
| 2020/0145688 A1 | 5/2020 | Zou et al. | |
| 2020/0213608 A1 | 7/2020 | Chen et al. | |
| 2020/0213612 A1 | 7/2020 | Liu et al. | |
| 2020/0228821 A1 | 7/2020 | Chuang et al. | |

OTHER PUBLICATIONS

Li et al., "An Efficient Four-Parameter Affine Motion Model for Video Coding," IEEE Transactions on Circuits and Systems for Video Technology, arXiv:1702.06297v1, dated Feb. 21, 2017, 14 pages.

* cited by examiner

FIG. 15

```
(S1510)      merge_flag
          if(merge_flag){
                affine_flag
                ...
          }
          else{
(S1520)         affine_flag
                if(affine_flag){
(S1530)             affine_param_flag
                }
(S1540)         mvp_idx
                ...
          }
```

FIG. 16

```
(S1610)    merge_flag
           if(merge_flag) {
               affine_flag
               ...
           }
           else{
(S1620)        affine_flag
               if(affine_flag) {
(S1630)            affine_param_flag
(S1640)            affine_mvp_idx
               }
               else{
(S1650)            mvp_idx
                   ...
               }
           }
```

FIG. 18

| | |
|---|---|
| (S1810) | merge_flag<br>if(merge_flag) {<br>  ...<br>}<br>else {<br>|
| (S1820) |     affine_flag<br>    if(affine_flag) { |
| (S1830) |         affine_param_flag<br>        if(affine_param_flag == 0 ) { |
| (S1840) |             mvd_CP 0<br>            mvd_CP 1<br>        }<br>        else { |
| (S1850) |             mvd_CP 0<br>            mvd_CP 1<br>            mvd_CP 2<br>        }<br>    }<br>} |

METHOD AND APPARATUS FOR ENTROPY-ENCODING AND ENTROPY-DECODING VIDEO SIGNAL

CROSS-REFERENCE TO RELATED APPLICATIONS

This application is a continuation of U.S. application Ser. No. 16/645,400, filed on Mar. 6, 2020, which is the National Stage filing under 35 U.S.C. 371 of International Application No. PCT/KR2018/013489, filed on Nov. 7, 2018, which claims the benefit of U.S. Provisional Application No. 62/555,053, filed on Sep. 7, 2017, and U.S. Provisional Application No. 62/646,891, filed on Mar. 22, 2018, the contents of the prior applications are all hereby incorporated by reference herein in their entirety.

TECHNICAL FIELD

The present disclosure relates to a method and apparatus for entropy-encoding and decoding a video signal and, more particularly, to a method and apparatus for designing a context-based adaptive binary arithmetic coding (CABAC) context model of syntax elements for an affine prediction.

BACKGROUND ART

Entropy coding is a process of generating a raw byte sequence payload (RBSP) by lossless-compressing syntax elements determined through an encoding process. In entropy coding, syntax elements are represented as brief data by assigning a short bit to a frequently occurring syntax and a long bit to a not-frequently occurring syntax using the statistics of syntaxes.

Among them, context-based adaptive binary arithmetic coding (CABAC) uses a probability model adaptively updated based on the context of syntaxes and a previously generated symbol during a process of performing binary arithmetic coding. However, such CABAC has problems in that complexity is high because it has a heavy computational load and parallel execution is difficult because CABAC has a sequential structure.

Accordingly, in the video compression technique, it is necessary to compress and transmit a syntax element more efficiently. To this end, it is necessary to improve performance of entropy coding.

SUMMARY

The disclosure is to propose a method for improving prediction performance of a context model when CABAC is performed.

The disclosure is to propose a method of performing context modeling on a syntax element (affine_flag, affine_param_flag, affine_mvp_idx, mvp_idx, etc.) related to an affine prediction.

The disclosure is to propose a method for improving throughput while maintaining coding performance based on context-based adaptive binary arithmetic coding (CABAC) bypass coding.

The disclosure proposes a method of performing context modeling on a syntax element (affine_flag, affine_param_flag, affine_mvp_idx, mvp_idx, etc.) related to an affine prediction.

The disclosure a method of determining the context index of a syntax element related to an affine prediction based on whether a neighbor block has been affine-coded.

The disclosure proposes a method of determining the context index of a syntax element related to an affine prediction based on at least one of whether a neighbor block has been affine-coded (condition 1) and/or which affine prediction mode has been applied (condition 2).

The disclosure proposes a method of and separately performing context modeling on a motion vector prediction index (affine_mvp_idx) for an affine prediction and a motion vector prediction index (mvp_idx) for a non-affine prediction.

The disclosure proposes a method of performing context-based adaptive binary arithmetic coding (CABAC) bypass coding on a syntax element related to an affine prediction.

The disclosure can improve performance of entropy coding/decoding by providing the method of performing context modeling on a syntax element related to an affine prediction when CABAC is performed.

Furthermore, the disclosure can determine a context model more suitable for a current block by determining the context index of a syntax element related to an affine prediction based on at least one of whether a neighbor block has been affine-coded (condition 1) and/or which affine prediction mode has been applied (condition 2), and can thus improve performance of entropy coding/decoding.

Furthermore, the disclosure can improve throughput while maintaining coding performance by performing context-based adaptive binary arithmetic coding (CABAC) bypass coding on a syntax element related to an affine prediction.

DESCRIPTION OF DRAWINGS

FIG. 15 is an embodiment to which the disclosure is applied, and illustrates a syntax structure for an affine motion prediction based on an affine flag.

FIG. 16 is an embodiment to which the disclosure is applied, and illustrates a syntax structure for separately decoding a motion predictor index for an affine prediction and a motion predictor index for an inter prediction.

FIG. 18 is an embodiment to which the disclosure is applied, and illustrates a syntax structure for performing decoding based on the AF4 mode or the AF6 mode.

BEST MODE

Figure 1:
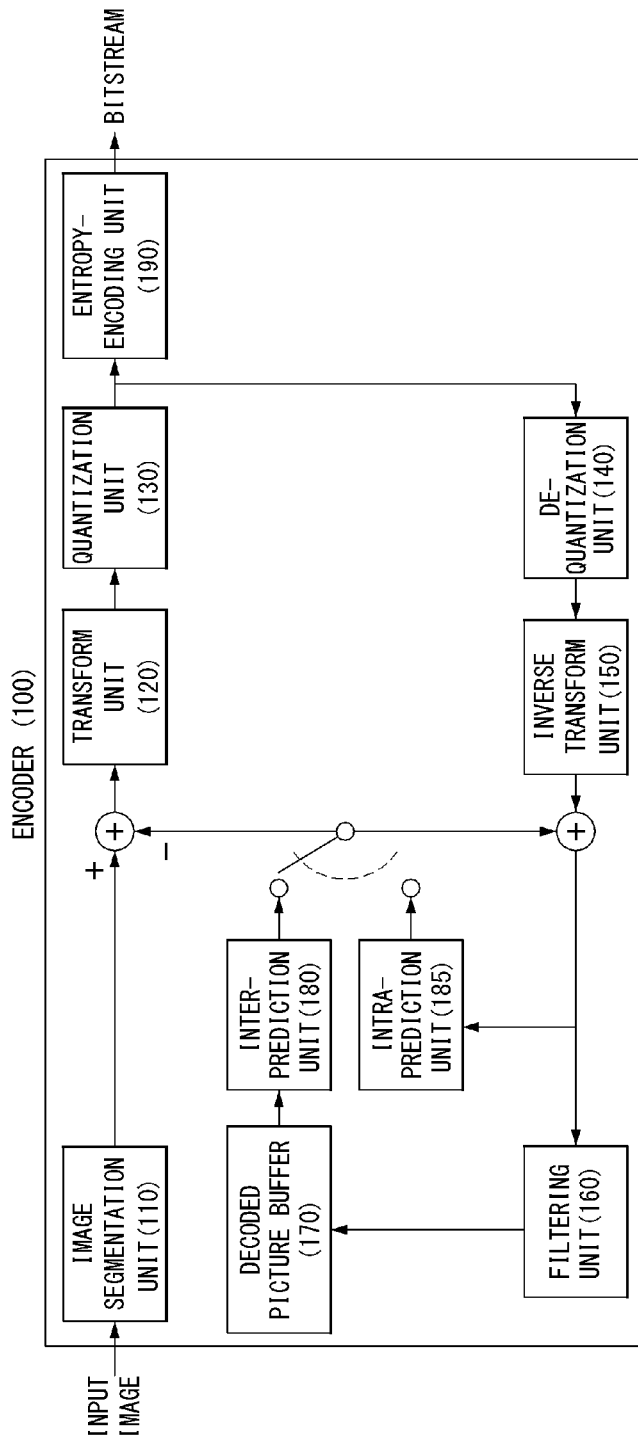
FIG. 1 is an embodiment to which the disclosure is applied, and illustrates a schematic diagram of an encoder in which the encoding of a video signal is performed.

The disclosure provides a method of performing entropy decoding on a video signal including a current block, including checking whether an affine motion prediction has been performed on a current block; parsing the affine parameter flag of the current block based on a predefined one context model when the affine motion prediction is performed on the current block as a result of the check; and updating the context model based on the affine parameter flag. The affine parameter flag is a flag indicating whether the affine motion prediction is performed based on an AF4 mode or an AF6 mode. The AF4 mode indicates that the affine motion prediction is performed by four parameters. The AF6 mode indicates that the affine motion prediction is performed by six parameters.

In the disclosure, when the affine motion prediction is performed on the current block, the context index of the current block always has a value of 0, and corresponds to the predefined one context model.

In the disclosure, the checking is performed based on at least one of affine coding information and/or affine prediction mode information of a left block and/or top block neighboring the current block.

The disclosure provides a method of performing entropy decoding on a video signal including a current block, including deriving affine coding information and/or affine prediction mode information of a left block and/or top block neighboring the current block; determining the context index of an affine prediction-related syntax element of the current block based on at least one of the affine coding information and/or affine prediction mode information of the left block and/or the top block; and entropy-decoding the affine prediction-related syntax element of the current block based on the context index. In this case, the affine coding information is information indicating whether an affine motion prediction has been performed. The affine prediction mode information is information indicating whether an affine motion prediction is performed based on an AF4 mode or an AF6 mode. The AF4 mode indicates that an affine motion prediction is performed by four parameters, and the AF6 mode indicates that an affine motion prediction is performed by six parameters.

In the disclosure, when the affine prediction-related syntax element includes an affine flag, the context index of the affine flag is determined based on the sum of the affine coding information of the left block and the affine coding information of the top block. The affine flag is a flag indicating whether an affine motion prediction has been performed.

In the disclosure, when the affine prediction-related syntax element includes an affine parameter flag, the context index of the affine parameter flag is determined based on the sum of a first value determined by the affine coding information and affine prediction mode information of the left block and a second value determined by the affine coding information and affine prediction mode information of the top block. The affine parameter flag is a flag indicating whether an affine motion prediction is performed based on the AF4 mode or the AF6 mode.

In the disclosure, when an affine motion prediction is performed on the left block based on the affine flag and the left block is coded based on the AF6 mode based on the affine parameter flag, the first value is determined as 1. If not, the first value is determined as 0.

In the disclosure, when an affine motion prediction is performed on the top block based on the affine flag and the top block is coded based on the AF6 mode based on the affine parameter flag, the second value is determined as 1. If not, the second value is determined as 0.

In the disclosure, when the affine prediction-related syntax element includes an affine motion vector predictor index and/or a non-affine motion vector predictor index, the affine motion vector predictor index and the non-affine motion vector predictor index are defined by different tables. The affine motion vector predictor index indicates a candidate used for an affine motion prediction, and the non-affine motion vector predictor index indicates a candidate used for an inter prediction.

The disclosure provides an apparatus performing entropy decoding on a video signal including a current block, including a context modeling unit configured to check whether a left block and top block neighboring the current block are available, derive affine coding information and/or affine prediction mode information of the left block and/or the top block when at least one of the left block and/or the top block is available, and determine a context index of an affine prediction-related syntax element of the current block based on at least one of the affine coding information and/or affine prediction mode information of the left block and/or the top block, and a binary arithmetic decoding unit configured to entropy-decode an affine prediction-related syntax element of the current block based on the context index. The affine coding information is information indicating whether an affine motion prediction has been performed. The affine prediction mode information is information indicating whether the affine motion prediction is performed based on an AF4 mode or an AF6 mode. The AF4 mode indicates that an affine motion prediction is performed by four parameters. The AF6 mode indicates that an affine motion prediction is performed by six parameters.

DETAILED DESCRIPTION

Hereinafter, exemplary elements and operations in accordance with embodiments of the disclosure are described with reference to the accompanying drawings. It is however to be noted that the elements and operations of the disclosure described with reference to the drawings are provided as only embodiments and the technical spirit and kernel configuration and operation of the disclosure are not limited thereto.

In addition, terms used in this specification are common terms that are now widely used, but in special cases, terms randomly selected by the applicant are used. In such a case, the meaning of a corresponding term is clearly described in the detailed description of a corresponding part. Accordingly, it is to be noted that the disclosure should not be construed as being based on only the name of a term used in a corresponding description of this specification and that the disclosure should be construed by checking even the meaning of a corresponding term.

Furthermore, terms used in the present disclosure are common terms selected to describe the disclosure, but may be replaced with other terms for more appropriate analysis if such terms having similar meanings are present. For example, a signal, data, a sample, a picture, a frame, and a block may be properly replaced and interpreted in each coding process.

In addition, the concepts and the methods described in the present disclosure may be applied to other embodiments, and the combination of the embodiments is also applicable within the inventive concept of the disclosure although it is not explicitly described in the present disclosure.

FIG. 1 is an embodiment to which the disclosure is applied, and illustrates a schematic diagram of an encoder in which the encoding of a video signal is performed.

Referring to FIG. 1, the encoder 100 may be configured to include an image segmentation unit 110, a transform unit 120, a quantization unit 130, a de-quantization unit 140, an inverse transform unit 150, a filtering unit 160, a decoded picture buffer (DPB) 170, an inter prediction unit 180, an intra prediction unit 185, and an entropy encoding unit 190.

The image segmentation unit 110 may segment an input image (or picture or frame), input to the encoder 100, into one or more processing units. For example, the processing unit may be a coding tree unit (CTU), a coding unit (CU), a prediction unit (PU) or a transform unit (TU). In this case, the segmentation may be performed by at least one method of a quadtree (QT), a binary tree (BT), a ternary tree (TT), or an asymmetric tree (AT).

In video coding, one block may be partitioned based on a quadtree (QT). Furthermore, one sub block partitioned by the QT may be further recursively partitioned using the QT. A leaf block that is no longer QT-partitioned may be partitioned by at least one method of a binary tree (BT), a ternary tree (TT) or an asymmetric tree (AT). The BT may have two types of partitions, including a horizontal BT (2N×N, 2N×N) and a vertical BT (N×2N, N×2N). The TT may have two types of partitions, including a horizontal TT (2N×1/2N, 2N×N, 2N×1/2N) and a vertical TT (1/2N×2N, N×2N, 1/2N×2N). The AT may have four types of partitions, including a horizontal-up AT (2N×1/2N, 2N×3/2N), a horizontal-down AT (2N×3/2N, 2N×1/2N), a vertical-left AT (1/2N×2N, 3/2N×2N), and a vertical-right AT (3/2N×2N, 1/2N×2N). The BT, TT, and AT may be further recursively partitioned using a BT, a TT, and an AT, respectively.

Meanwhile, the BT, TT, and AT may be together used and partitioned. For example, a subblock partitioned by a BT may be partitioned by a TT or an AT. Furthermore, a subblock partitioned by a TT may be partitioned by a BT or an AT. A subblock partitioned by an AT may be partitioned by a BT or a TT. For example, after a horizontal BT partition, each subblock may be partitioned into vertical BTs or after a vertical BT partition, each subblock may be partitioned into horizontal BTs. The two types of partition methods are different in their sequence, but have the same shape that is finally partitioned.

Furthermore, the sequence in which a block is searched for after the block is partitioned may be defined in various ways. In general, search is performed from the left to the right and from the top to the bottom. To search for a block may mean a sequence for determining whether each partitioned subblock will be block-partitioned, may mean the coding sequence of each subblock if a block is no longer partitioned, or may mean a search sequence when reference is made to information of another neighbor block in a subblock.

In this case, the terms are merely used for convenience of description of the disclosure, and the disclosure is not limited to the definition of a corresponding term. Furthermore, in the disclosure, for convenience of description, a term called a coding unit is used as a unit used in a process of encoding or decoding a video signal, but the disclosure is not limited thereto and the term may be properly interpreted based on the contents of the disclosure.

The encoder 100 may generate a residual signal by subtracting a prediction signal, output by the inter prediction unit 180 or the intra prediction unit 185, from the input image signal. The generated residual signal is transmitted to the transform unit 120.

The transform unit 120 may generate a transform coefficient by applying a transform scheme to the residual signal. The transform process may be applied to a pixel block having a square having the same size and may be applied to a block having a variable size, that is, not a square.

The quantization unit 130 may quantize the transform coefficient and transmit it to the entropy encoding unit 190. The entropy encoding unit 190 may entropy-code the quantized signal and output it as a bitstream.

The entropy encoding unit 190 may perform entropy encoding on syntax elements. This is more specifically described in FIG. 3 and the disclosure.

For example, an embodiment of the disclosure proposes a method of performing context modeling on a syntax element (affine_flag, affine_param_flag, affine_mvp_idx, mvp_idx, etc.) related to an affine prediction.

Another embodiment proposes a method of determining the context index of a syntax element related to an affine prediction based on whether a neighbor block has been affine-coded.

Another embodiment proposes a method of determining the context index of a syntax element related to an affine prediction based on at least one of whether a neighbor block has been affine-coded (condition 1) and/or which affine prediction mode has been applied (condition 2).

Another embodiment proposes a method of separately performing context modeling on a motion vector prediction index (affine_mvp_idx) for an affine prediction and a motion vector prediction index (mvp_idx) for a non-affine prediction.

Another embodiment proposes a method of performing context-based adaptive binary arithmetic coding (CABAC) bypass coding on a syntax element related to an affine prediction.

The quantized signal output by the quantization unit 130 may be used to generate a prediction signal. For example, a residual signal may be reconstructed by applying de-quantization and an inverse transform to the quantized signal through the de-quantization unit 140 and the inverse transform unit 150 within a loop. A reconstructed signal may be generated by adding the reconstructed residual signal to the prediction signal output by the inter prediction unit 180 or the intra prediction unit 185.

Meanwhile, in such a compression process, artifacts in which a block boundary appears because neighboring blocks are quantized by different quantization parameters may occur. Such a phenomenon is called a blocking artifact. The block artifact is one of important factors to evaluate picture quality. In order to reduce such artifacts, a filtering process may be performed. Picture quality can be improved by removing blocking artifacts and also reducing an error of a current picture through such a filtering process.

The filtering unit 160 may apply filtering to the reconstructed signal and output it to a playback device or transmit it to the decoded picture buffer 170. The filtered signal transmitted to the decoded picture buffer 170 may be used as a reference picture in the inter prediction unit 180. As described above, both picture quality and coding efficiency can be improved using the filtered picture as a reference picture in an inter prediction mode.

The decoded picture buffer 170 may store the filtered picture in order to use it as a reference picture in the inter prediction unit 180.

The inter prediction unit 180 performs a temporal prediction and/or a spatial prediction with reference to a reconstructed picture in order to remove temporal redundancy and/or spatial redundancy. In this case, the reference picture used to perform the prediction may include a blocking artifact or a ringing artifact because it is a signal on which quantization and de-quantization has been previously performed in a block unit upon coding/decoding.

Accordingly, in order to solve the discontinuity of such a signal or performance degradation attributable to quantization, the inter prediction unit 180 may interpolate a signal between pixels in a subpixel unit by applying a lowpass filter. In this case, the subpixel means a virtual pixel generated by applying an interpolation filter, and an integer pixel means an actual pixel present in a reconstructed picture. Linear interpolation, bi-linear interpolation or a wiener filter may be applied as an interpolation method.

The interpolation filter may be applied to the reconstructed picture, thereby being improving the precision of a prediction. For example, the inter prediction unit 180 may generate an interpolation pixel by applying an interpolation filter to an integer pixel, and may perform a prediction using an interpolated block configured with interpolation pixels as a prediction block.

The inter prediction unit 180 may perform an affine motion vector prediction based on at least one of an affine flag and/or an affine parameter flag.

In the disclosure, an affine mode (AF mode) means an affine motion prediction mode using an affine motion model, and may include at least one of an affine merge mode or an affine inter mode, for example. The affine inter mode may include at least one of an AF4 mode or an AF6 mode.

The affine flag may indicate whether an affine prediction (affine motion prediction or affine motion vector prediction) is performed or may indicate whether an AF mode is performed. For example, the affine flag may be represented as affine_flag. The affine flag indicates that an AF mode is applied to a current block when the affine_flag=1, and indicates that an AF mode is not applied to the current block when the affine_flag=0.

When an AF mode is not applied to a current block, the decoder may perform decoding (i.e., motion vector prediction) based on a coding mode not an AF mode. For example, a skip mode, a merge mode or an inter mode may be used.

The affine parameter flag is a flag indicating whether an affine motion prediction is performed based on the AF4 mode or the AF6 mode. For example, the affine parameter flag may be represented as affine_param_flag. The affine parameter flag may mean that a motion vector prediction is performed based on the AF4 mode when the affine_param_flag=0, and that a motion vector prediction is performed based on the AF6 mode when the affine_param_flag=1, but the disclosure is not limited thereto.

For another example, the affine parameter flag may include at least one of AF4_flag and AF6_flag.

AF4_flag indicates whether the AF4 mode is performed on a current block. The AF4 mode is performed on the current block when AF4_flag=1, and the AF4 mode is not performed on the current block when AF4_flag=0. In this case, if the AF4 mode is performed, this means that a motion vector prediction is performed using an affine motion model represented as four parameters.

AF6_flag indicates whether the AF6 mode is performed on a current block. The AF6 mode is performed on the current block when AF6_flag=1, and the AF6 mode is not performed on the current block when AF6_flag=0. In this case, if the AF6 mode is performed, this means that a motion vector prediction is performed using an affine motion model represented as six parameters.

The affine flag and the affine parameter flag may be defined in at least one level of a slice, a maximum coding unit, a coding unit or a prediction unit. For example, at least one of AF_flag, AF4_flag and AF6_flag may be defined in a slice level, and may be defined in a block level or a prediction unit level.

The intra prediction unit 185 may predict a current block with reference to surrounding samples of a block on which coding is to be performed. The intra prediction unit 185 may perform the following process in order to perform an intra prediction. First, a reference sample necessary to generate a prediction signal may be prepared. Furthermore, a prediction signal may be generated using the prepared reference sample. Thereafter, a prediction mode is coded. In this case, the reference sample may be prepared through reference sample padding and/or reference sample filtering. The reference sample may include a quantization error because it has been experienced a prediction and reconstruction process. Accordingly, in order to reduce such an error, a reference sample filtering process may be performed on each prediction mode used for an intra prediction.

The prediction signal generated through the inter prediction unit 180 or the intra prediction unit 185 may be used to generate a reconstructed signal or to generate a residual signal.

Figure 2:
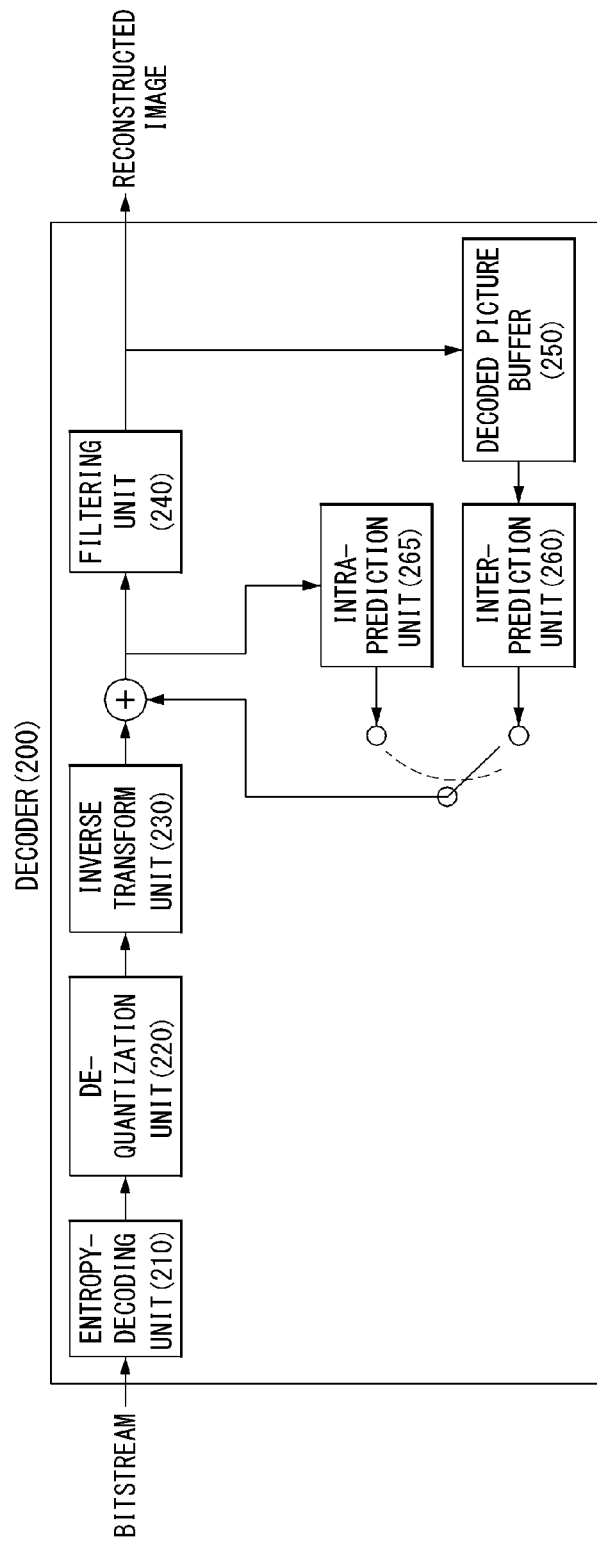
FIG. 2 is an embodiment to which the disclosure is applied, and illustrates a schematic block diagram of a decoder in which the decoding of a video signal is performed.

FIG. 2 is an embodiment to which the disclosure is applied, and illustrates a schematic block diagram of a decoder in which the decoding of a video signal is performed.

Referring to FIG. 2, the decoder 200 may be configured to include a parsing unit (not illustrated), an entropy decoding unit 210, a de-quantization unit 220, an inverse transform unit 230, a filtering unit 240, a decoded picture buffer (DPB) unit 250, an inter prediction unit 260, an intra prediction unit 265 and a reconstruction unit (not illustrated).

The decoder 200 may receive a signal output by the encoder 100 in FIG. 1, and may parse or obtain a syntax element through the parsing unit (not illustrated). The parsed or obtained signal may be entropy-decoded through the entropy decoding unit 210. This is more specifically described in FIG. 4 and the disclosure.

For example, an embodiment of the disclosure proposes a method of performing context modeling on a syntax element (affine_flag, affine_param_flag, affine_mvp_idx, mvp_idx, etc.) related to an affine prediction.

Another embodiment proposes a method of determining the context index of a syntax element related to an affine prediction based on whether a neighbor block has been affine-coded.

Another embodiment proposes a method of determining the context index of a syntax element related to an affine prediction based on at least one of whether a neighbor block has been affine-coded (condition 1) and/or which affine prediction mode has been applied (condition 2).

Another embodiment proposes a method of separately performing context modeling on a motion vector prediction index (affine_mvp_idx) for an affine prediction and a motion vector prediction index (mvp_idx) for a non-affine prediction.

Another embodiment proposes a method of performing context-based adaptive binary arithmetic coding (CABAC) bypass coding on a syntax element related to an affine prediction.

The de-quantization unit 220 obtains a transform coefficient from the entropy-decoded signal using quantization step size information.

The inverse transform unit 230 obtains a residual signal by inverse-transforming the transform coefficient.

The reconstruction unit (not illustrated) generates a reconstructed signal by adding the obtained residual signal to the prediction signal output by the inter prediction unit 260 or the intra prediction unit 265.

the filtering unit 240 applies filtering to the reconstructed signal and outputs the filtered signal to a playback device or transmits it to the decoded picture buffer unit 250. The filtered signal transmitted to the decoded picture buffer unit 250 may be used as a reference picture in the inter prediction unit 260.

In the disclosure, the embodiments described in the filtering unit 160, inter prediction unit 180 and intra prediction unit 185 of the encoder 100 may be identically applied to the filtering unit 240, inter prediction unit 260 and intra prediction unit 265 of the decoder, respectively.

The reconstructed video signal output through the decoder 200 may be played back through a playback device.

Figure 3:
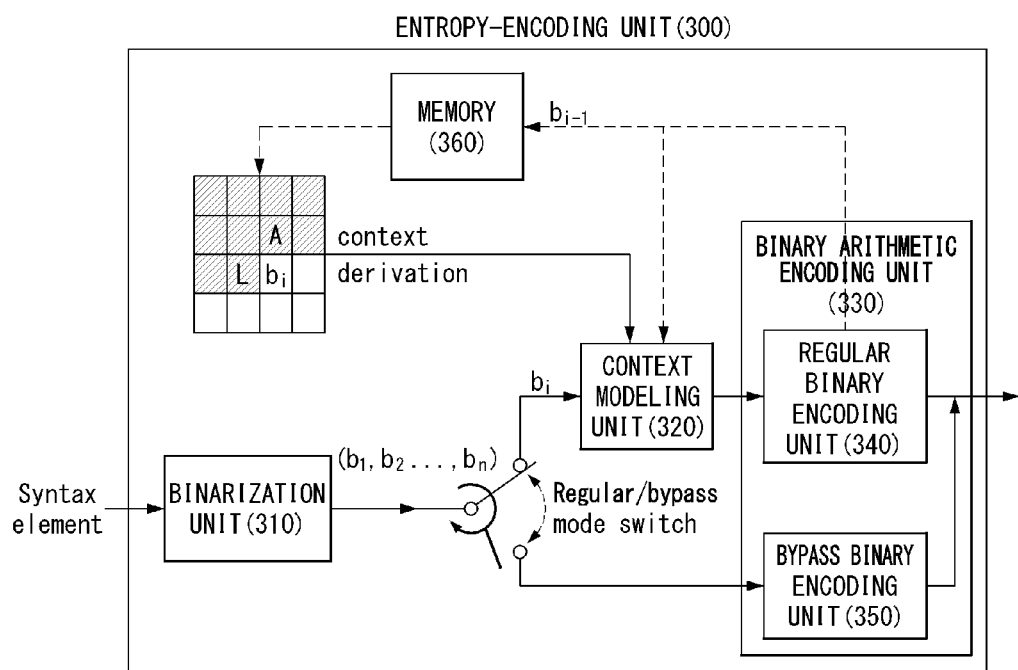
FIG. 3 illustrates a schematic block diagram of an entropy-encoding unit to which context-based adaptive binary arithmetic coding (CABAC) is applied, as an embodiment to which the disclosure is applied.

FIG. 3 illustrates a schematic block diagram of an entropy encoding unit to which context-based adaptive binary arithmetic coding (CABAC) is applied, as an embodiment to which the disclosure is applied.

An entropy-encoding unit 300 to which the disclosure is applied includes a binarization unit 310, a context modeling unit 320, a binary arithmetic encoding unit 330 and a memory 360. The binary arithmetic encoding unit 330 includes a regular binary encoding unit 340 and a bypass binary encoding unit 350. In this case, the regular binary encoding unit 340 and the bypass binary encoding unit 350 may be called as a regular coding engine and a bypass coding engine, respectively.

The binarization unit 310 may receive a sequence of data symbols and perform binarization thereon to output a binary symbol (bin) string including a binarized value of 0 or 1. The binarization unit 310 may map syntax elements to binary symbols. Various different binarization processes, e.g., unary (U), truncated unary (TU), k-order Exp-Golomb (EGk), and fixed length processes, and the like, may be used for binarization. The binarization process may be selected on the basis of a type of a syntax element.

The output binary symbol string is transmitted to the context modeling unit 320.

The context modeling unit 320 selects probability information necessary to code a current block from the memory, and transmits it to the binary arithmetic encoding unit 330. For example, the context modeling unit 320 may select a context memory based on a syntax element to code, and may select probability information necessary to code a current syntax element through a bin index (binIdx). In this case, the context means information on the probability that a symbol is generated. The context modeling means a process of estimating the probability of a bin necessary for binary arithmetic coding using a bin, that is, a result of binarization, as an input.

The context modeling unit 320 may provide accurate probability estimation necessary to obtain high coding efficiency. Thus, different context models may be used for different binary symbols, and the probability of context models may be updated based on values of previously coded binary symbols. In this case, the values of previously coded binary symbols may be stored in the memory 360, and the context modeling unit 320 may use the values of previously coded binary symbols from it.

Binary symbols having a similar distribution may share the same context model. A context model related to each binary symbol may use at least one of syntax information of a bin, a bin index indicating the position of the bin in a bin string and the probability of a bin included in a neighboring block of a block including the bin.

An embodiment of the disclosure proposes a method of performing context modeling on a syntax element (affine_flag, affine_param_flag, affine_mvp_idx, mvp_idx, etc.) related to an affine prediction.

Another embodiment proposes a method of determining the context index of a syntax element related to an affine prediction based on whether a neighbor block has been affine-coded.

According to the disclosure, when a context model is determined, the binary arithmetic encoding unit 330 may perform binary arithmetic encoding based on the context model.

The binary arithmetic encoding unit 330 includes a regular binary encoding unit 340 and a bypass binary encoding unit 350, and performs entropy-encoding on the output string and outputs compressed data bits.

The regular binary encoding unit 340 performs an arithmetic coding based on recursive interval division.

First, an interval (or a range) having an initial value of 0 to 1 is divided into two subintervals based on the probability of the bin. The encoded bits provide an offset that, when converted to a binary fraction, selects one of the two subintervals, which indicates the value of the decoded bin.

After every decoded bin, the interval may be updated to equal the selected subinterval, and the interval division process repeats itself. The interval and offset have limited bit precision, so renormalization may be required whenever the interval falls below a specific value to prevent underflow. The renormalization may occur after each bin is decoded.

The bypass binary encoding unit 350 performs encoding without a context mode, and performs coding by fixing probability of a currently coded bin to 0.5. This may be used when it is difficult to determine a probability of syntax or it is designed to code with high speed.

Figure 4:
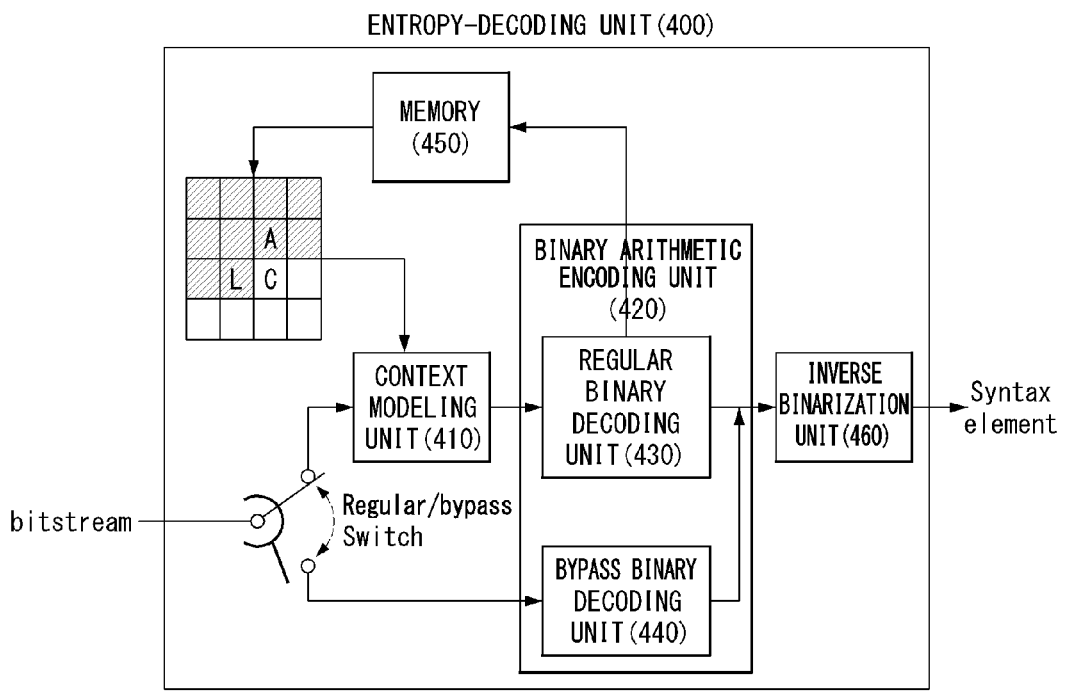
FIG. 4 illustrates a schematic block diagram of an entropy-decoding unit to which context-based adaptive binary arithmetic coding (CABAC) is applied, as an embodiment to which the disclosure is applied.

FIG. 4 illustrates a schematic block diagram of an entropy-decoding unit to which context-based adaptive binary arithmetic coding (CABAC) is applied, as an embodiment to which the disclosure is applied.

An entropy-decoding unit 400 includes a context modeling unit 410, a binary arithmetic decoding unit 420, a memory 450 and an inverse binarization unit 460. The binary arithmetic decoding unit 420 includes a regular binary decoding unit 430 and a bypass binary decoding unit 440.

The entropy-decoding unit 400 may receive a bit stream and identify a bypass flag in the bit stream. In this case, the bypass flag indicates whether a mode is a bypass mode. The bypass mode means that coding is performed by fixing the probability of a currently coded bin to 0.5 without using a context model.

If a mode is not the bypass mode based on the bypass flag, the regular binary decoding unit 430 performs binary arithmetic decoding according to the regular mode.

In this case, the context modeling unit 410 selects probability information necessary to decode a current bit stream from the memory 450, and transmits the probability information to the regular binary decoding unit 430.

An embodiment of the disclosure proposes a method of performing context modeling on a syntax element (affine_flag, affine_param_flag, affine_mvp_idx, mvp_idx, etc.) related to an affine prediction.

Another embodiment proposes a method of determining the context index of a syntax element related to an affine prediction based on whether a neighbor block has been affine-coded.

According to the disclosure, when the context model is determined, the binary arithmetic decoding unit 420 may perform binary arithmetic decoding based on the context model.

Meanwhile, in the case of the bypass mode according to the bypass flag, the bypass binary decoding unit 440 performs a binary arithmetic decoding according to the bypass mode.

The inverse binarization unit 460 receives bin in a binary number form decoded from the binary arithmetic decoding unit 420, and transforms and outputs it into a syntax element value in an integer form.

Figure 5:
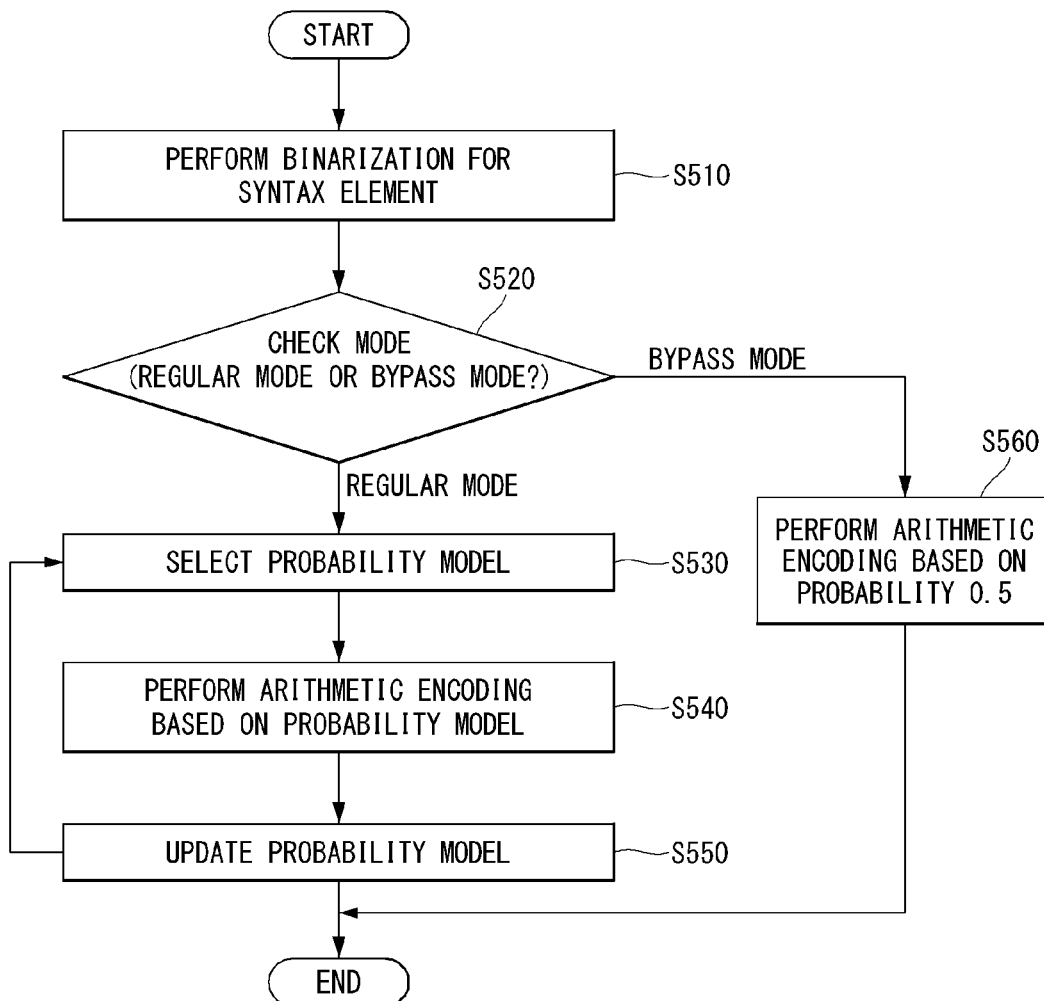
FIG. 5 illustrates an encoding flowchart performed according to context-based adaptive binary arithmetic coding (CABAC), as an embodiment to which the disclosure is applied.

FIG. 5 illustrates an encoding flowchart performed according to context-based adaptive binary arithmetic coding (CABAC), as an embodiment to which the disclosure is applied.

An encoder may perform a binarization for a syntax element (S510).

The encoder may check whether to perform binary arithmetic coding according to the regular mode or perform binary arithmetic coding according to the bypass mode (S520). For example, the encoder may check whether it is in the regular mode or the bypass mode based on a bypass flag, and for example, when the bypass flag is 1, this may indicate the bypass mode, and when the bypass flag is 0, this may indicate the regular mode.

When a mode is the regular mode, the encoder may select a probability model (S530), and may perform binary arithmetic decoding based on the probability model (S540). Further, the encoder may update the probability model (S550), and may select a proper probability model again based on the updated probability model updated in step S530.

In an embodiment of the disclosure, context modeling may be performed on a syntax element (affine_flag, affine_param_flag, affine_mvp_idx, mvp_idx, etc.) related to an affine prediction.

In another embodiment, the context index of a syntax element related to an affine prediction may be determined based on whether a neighbor block has been affine-coded.

In another embodiment, the context index of a syntax element related to an affine prediction may be determined based on at least one of whether a neighbor block has been affine-coded (condition 1) and/or which affine prediction mode has been applied (condition 2).

In another embodiment, context modeling may be separately performed on a motion vector prediction index (affine_mvp_idx) for an affine prediction and a motion vector prediction index (mvp_idx) for a non-affine prediction.

Meanwhile, when a mode is the bypass mode, the encoder may perform binary arithmetic encoding based on a probability 0.5 (S560).

An embodiment of the disclosure proposes a method of performing context-based adaptive binary arithmetic coding (CABAC) bypass coding on a syntax element related to an affine prediction.

Figure 6:
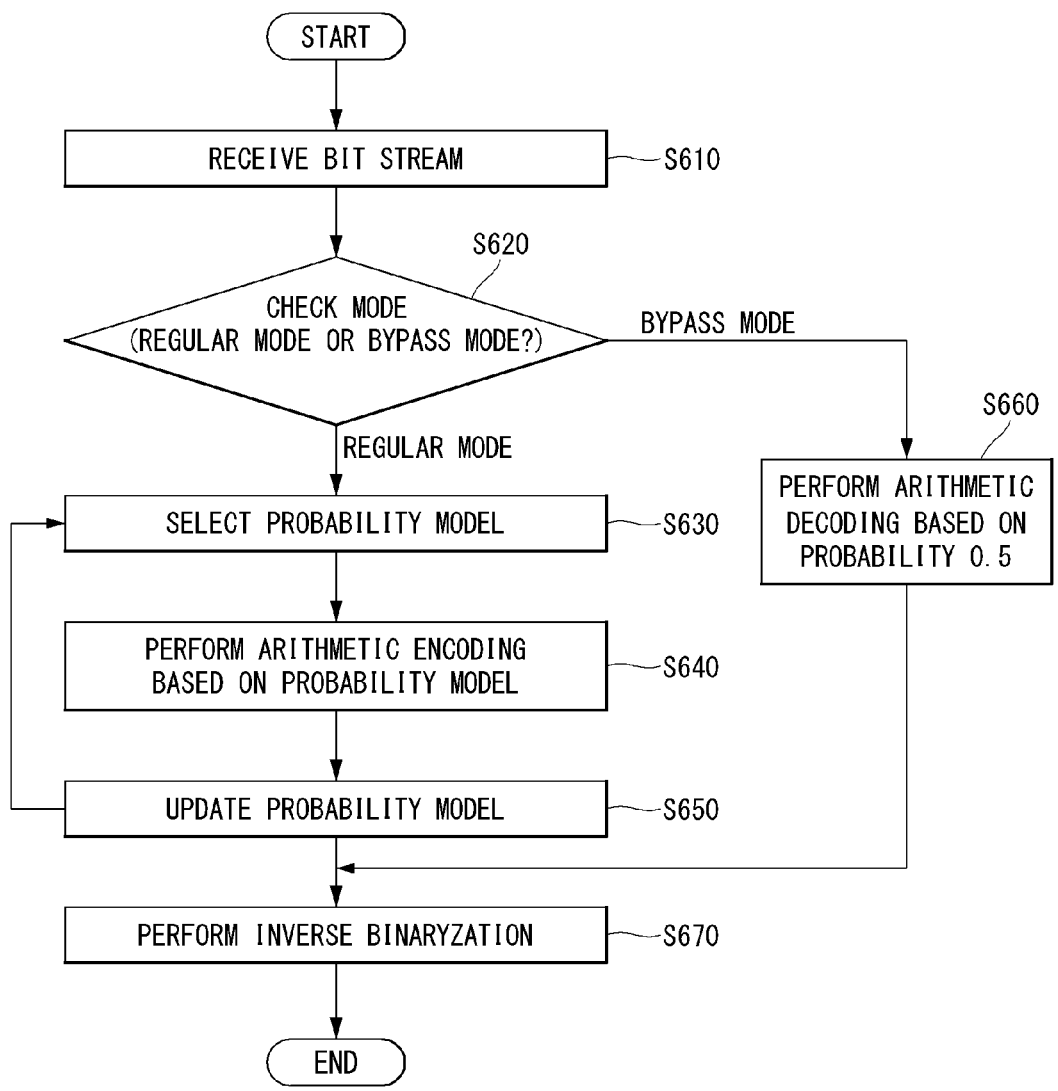
FIG. 6 is an embodiment to which the disclosure is applied, and illustrates a decoding flowchart performed according to context-based adaptive binary arithmetic coding (CABAC).

FIG. 6 is an embodiment to which the disclosure is applied, and illustrates a decoding flowchart performed according to context-based adaptive binary arithmetic coding (CABAC).

First, the decoder may receive a bitstream (S610).

The decoder may confirm whether a mode is a regular mode or a bypass mode by extracting a bypass flag from the bitstream (S620). In this case, the bypass flag may have been previously determined based on the type of syntax.

For example, context-based adaptive binary arithmetic coding (CABAC) bypass coding may be performed on a syntax element related to an affine prediction.

When the bypass flag indicates the regular mode, the decoder may select a probability model (S630), and may perform binary arithmetic decoding based on the probability model (S640). Furthermore, the decoder may update the probability model (S650), and may select a proper probability model based on the probability model updated in step S630.

In an embodiment of the disclosure, context modeling may be performed on a syntax element (affine_flag, affine_param_flag, affine_mvp_idx, mvp_idx, etc.) related to an affine prediction.

In another embodiment, the context index of a syntax element related to an affine prediction may be determined based on whether a neighbor block has been affine-coded.

In another embodiment, the context index of a syntax element related to an affine prediction may be determined based on at least one of whether a neighbor block has been affine-coded (condition 1) and/or which affine prediction mode has been applied (condition 2).

In another embodiment, context modeling may be separately performed on a motion vector prediction index (affine_mvp_idx) for an affine prediction and a motion vector prediction index (mvp_idx) for a non-affine prediction.

Meanwhile, when the bypass flag indicates the bypass mode, the decoder may perform binary arithmetic decoding based on a probability of 0.5 (S660).

The decoder may perform reverse binarization on a decoded bin string (S670). For example, the decoder may receive a bin of a decoded binary form, may transform the bit into a syntax element value of an integer form, and may output the value.

Figure 7:
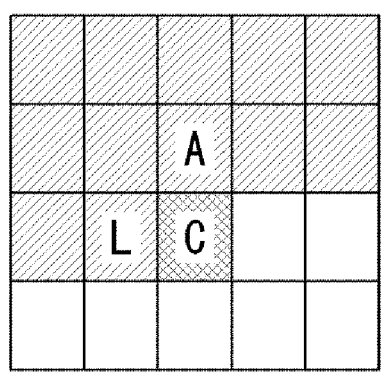
FIG. 7 is an embodiment to which the disclosure is applied, and illustrates a block relation diagram for describing a method of selecting a context model based on a neighbor block.

FIG. 7 is an embodiment to which the disclosure is applied, and illustrates a block relation diagram for describing a method of selecting a context model based on a neighbor block.

A context model of CABAC may be considered in various ways depending on statistical characteristics. For example, when one context model is used, it may be used without considering a special condition. However, when three context models are used, a context model may be designed based on a condition, that is, the syntax element of a neighbor block.

Referring to FIG. 7, it is assumed that a current block is C, a left block neighboring the current block is L, and a top block is A. A context model for the syntax of the current block C may be determined using at least one of the left block L or top block A, that is, a neighbor block. Equation 1 shows a method of selecting a context model using a left block and a top block.

$$\text{CtxIdx} = (\text{cond}L \ \& \ \&\text{available}L) + (\text{cond}A \ \& \ \&\text{available}A) \quad \text{[Equation 1]}$$

In this case, availableL and availableA indicate whether a left block and a top block are present, respectively. condL and condA mean values of corresponding syntaxes for the left block and the top block, respectively.

According to Equation 1, three context models may be used based on a syntax value of a neighbor block. The context model may be determined based on a syntax value of a neighbor block regardless of the size of a current block or the size of a neighbor block. However, the statistical characteristics of an affine prediction-related syntax element may be different depending on information related to the affine prediction coding of a neighbor block.

Accordingly, the disclosure proposes a method of determining a context model based on information related to the affine prediction coding of a neighbor block.

Figure 8:
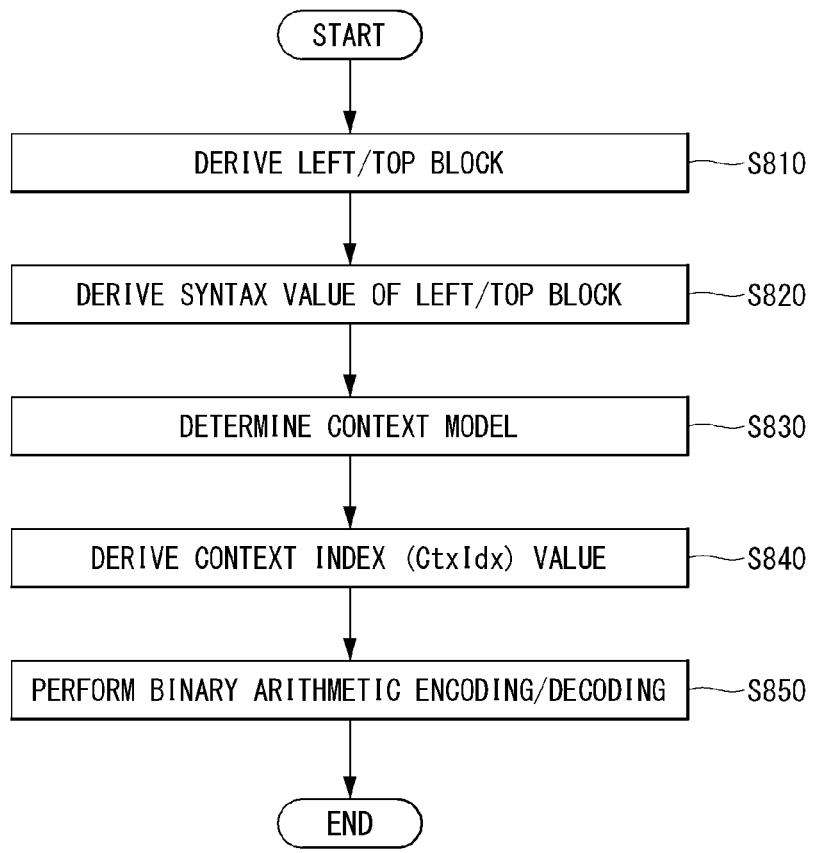
FIG. 8 is a flowchart illustrating a method of selecting a context model using a left block and a top block, as an embodiment to which the disclosure is applied.

FIG. 8 is a flowchart illustrating a method of selecting a context model using a left block and a top block, as an embodiment to which the disclosure is applied.

According to the disclosure, the method of selecting a context model may be applied to both the encoder and the decoder. This is described based on the decoder, for convenience of description.

First, the decoder may derive a left block and a top block neighboring a current block (S810). That is, the decoder may check whether the left block and the top block neighboring the current block are available.

When at least one of the left block and the top block is available, the decoder may derive a syntax value from at least one of the left block and the top block (S820).

In addition, the decoder may determine a context model based on a syntax value of at least one of the left block and the top block (S830).

The decoder may derive a context index (CtxIdx) value based on the determined context model (S840).

The decoder may perform binary arithmetic decoding based on the context index (CtxIdx) value (S850).

Figure 9:
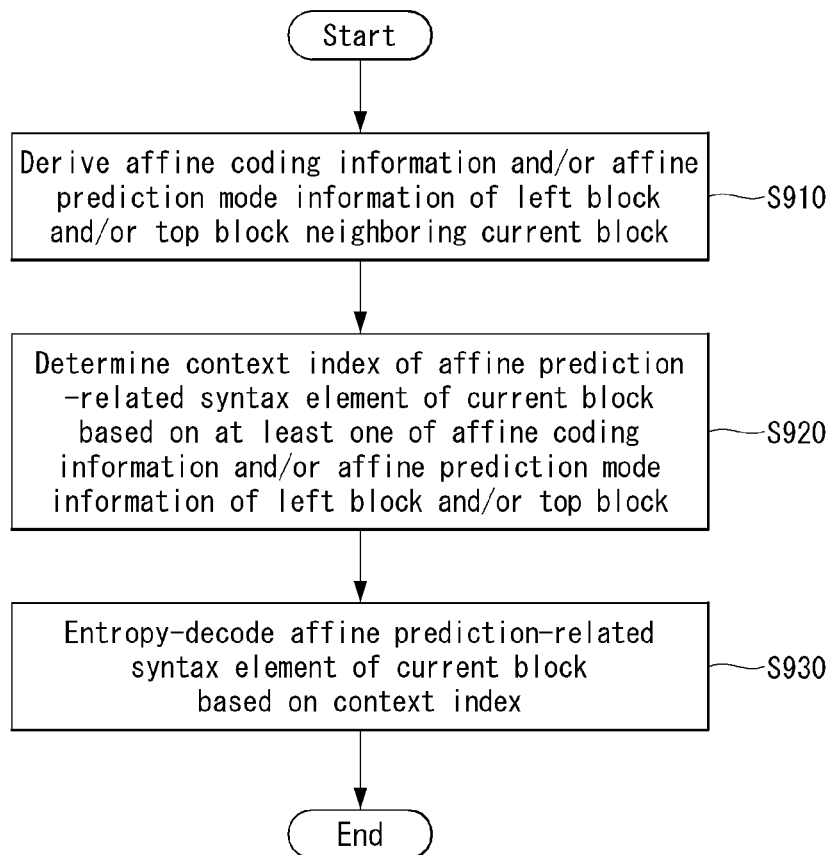
FIG. 9 is an embodiment to which the disclosure is applied, and is a flowchart illustrating a process of entropy-decoding an affine prediction-related syntax element of a current block.

FIG. 9 is an embodiment to which the disclosure is applied, and is a flowchart illustrating a process of entropy-decoding an affine prediction-related syntax element of a current block.

The decoder may derive affine coding information and/or affine prediction mode information of a left block and/or top block neighboring a current block (S910).

In this case, the affine coding information is information indicating whether an affine motion prediction has been performed. For example, the affine coding information of the left block may be indicated as affine_L, and the affine coding information of the top block may be indicated as affine_A.

The affine prediction mode information is information indicating whether an affine motion prediction is performed based on the AF4 mode or the AF6 mode. The AF4 mode indicates that an affine motion prediction is performed by four parameters. The AF6 mode indicates that an affine motion prediction is performed by six parameters. For example, the affine prediction mode information of the left block may be indicated as affine_param_L, and the affine prediction mode information of the top block may be indicated as affine_param_A.

The decoder may determine the context index of an affine prediction-related syntax element of the current block based on at least one of the affine coding information and/or affine prediction mode information of the left block and/or the top block (S920).

The decoder may entropy-decode the affine prediction-related syntax element of the current block based on the context index (S930).

The entropy-decoded affine prediction-related syntax element may be used for an affine motion vector prediction.

Figure 10:
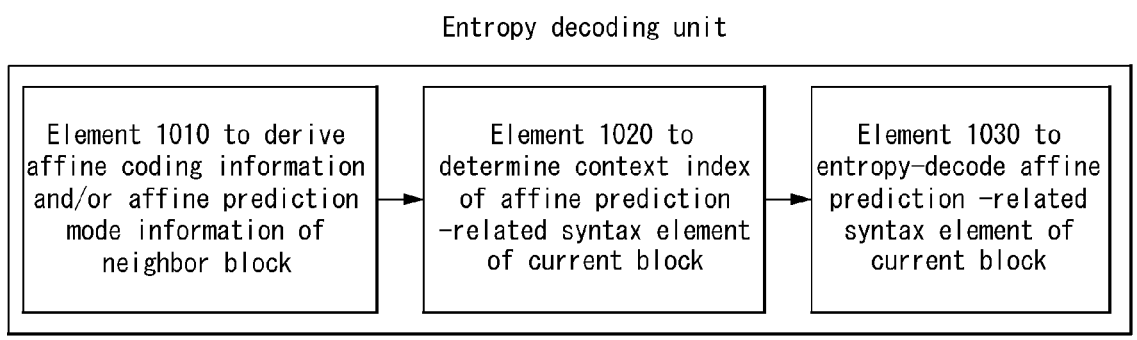
FIG. 10 is an embodiment to which the disclosure is applied, and is a schematic block diagram of an apparatus for entropy-decoding the affine prediction-related syntax element of a current block.

FIG. 10 is an embodiment to which the disclosure is applied, and is a schematic block diagram of an apparatus for entropy-decoding the affine prediction-related syntax element of a current block.

The entropy decoding unit to which the disclosure is applied may include an element 1010 to derive affine coding information and/or affine prediction mode information of a neighbor block, an element 1020 to determine the context index of an affine prediction-related syntax element of a current block, and an element 1030 to entropy-decode the affine prediction-related syntax element of the current block.

The element 1010 to derive affine coding information and/or affine prediction mode information of a neighbor block may derive affine coding information and/or affine prediction mode information of a left block and/or top block neighboring a current block.

The element 1020 to determine the context index of an affine prediction-related syntax element of a current block may determine the context index of an affine prediction-related syntax element of the current block based on at least one of the affine coding information and/or affine prediction mode information of the top block and/or the left block.

The element 1030 to entropy-decode the affine prediction-related syntax element of the current block may entropy-decode the affine prediction-related syntax element of the current block based on the context index.

The entropy-decoded affine prediction-related syntax element may be used for an affine motion vector prediction.

Figure 11:
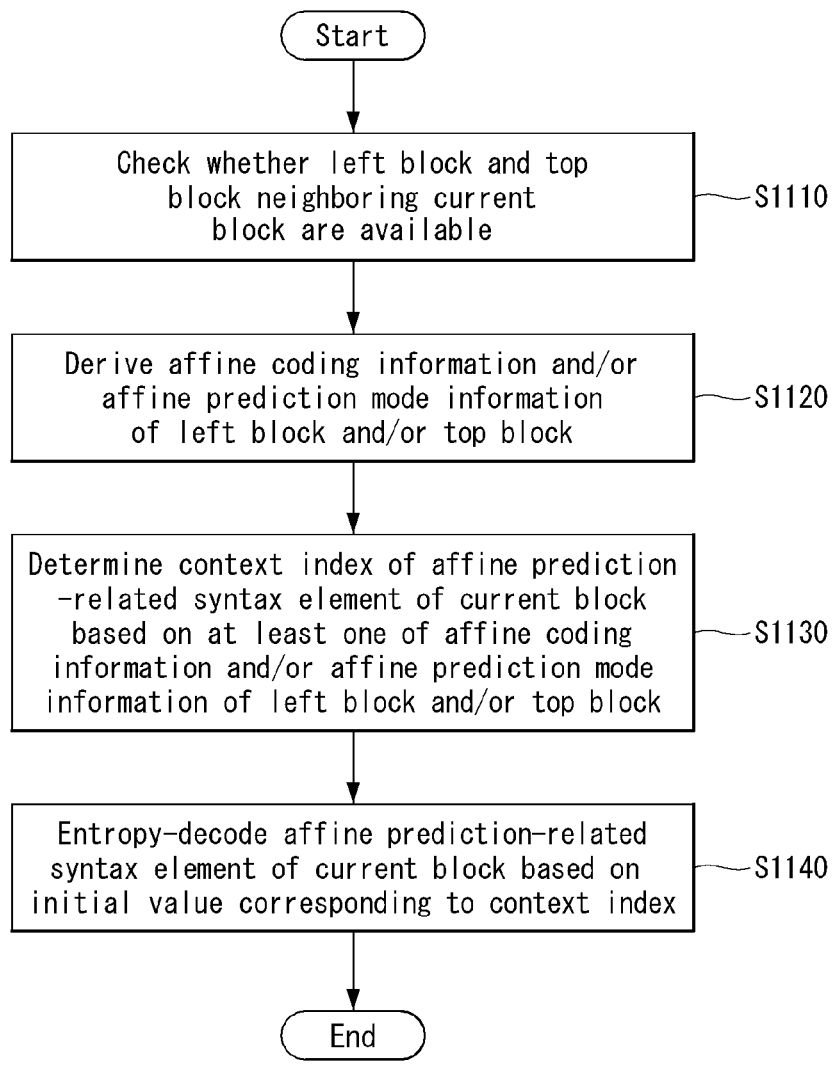
FIG. 11 is an embodiment to which the disclosure is applied, and is a flowchart illustrating a process of entropy-decoding the affine prediction-related syntax element of a current block based on affine prediction coding-related information of a neighbor block.

FIG. 11 is an embodiment to which the disclosure is applied, and is a flowchart illustrating a process of entropy-decoding the affine prediction-related syntax element of a current block based on affine prediction coding-related information of a neighbor block.

The decoder may check whether a left block and top block neighboring a current block are available (S1110).

If at least one of the left block and/or the top block is available, the decoder may derive affine coding information and/or affine prediction mode information of the left block and/or the top block (S1120).

In this case, the affine coding information is information indicating whether an affine motion prediction has been performed. For example, the affine coding information of the left block may be indicated as affine_L, and the affine coding information of the top block may be indicated as affine_A.

The affine prediction mode information is information indicating whether an affine motion prediction is performed based on the AF4 mode or the AF6 mode. The AF4 mode indicates that an affine motion prediction is performed by four parameters, and the AF6 mode indicates that an affine motion prediction is performed by six parameters. For example, the affine prediction mode information of the left block may be indicated as affine_param_L, and the affine prediction mode information of the top block may be indicated as affine_param_A.

The decoder may determine the context index of an affine prediction-related syntax element of the current block based on at least one of the affine coding information and/or affine prediction mode information of the left block and/or the top block (S1130).

In one embodiment, when the affine prediction-related syntax element includes an affine flag, the context index of the affine flag may be determined based on the sum of the affine coding information of the left block and the affine coding information of the top block. In this case, the affine flag indicates whether an affine motion prediction has been performed.

In one embodiment, when the affine prediction-related syntax element includes an affine parameter flag, the context index of the affine parameter flag may be determined based on the sum of a first value determined by the affine coding information and affine prediction mode information of the left block and a second value determined by the affine coding information and affine prediction mode information of the top block. In this case, the affine parameter flag indicates whether an affine motion prediction is performed based on the AF4 mode or the AF6 mode.

For example, when an affine motion prediction is performed on the left block based on the affine flag and the left block is coded based on the AF6 mode based on the affine parameter flag, the first value is determined as 1. If not, the first value is determined as 0.

For example, when an affine motion prediction is performed on the top block based on the affine flag and the top block is coded based on the AF6 mode based on the affine parameter flag, the second value is determined as 1. If not, the second value is determined as 0.

For another example, when the affine prediction-related syntax element includes an affine motion vector predictor index and/or a non-affine motion vector predictor index, the affine motion vector predictor index and the non-affine motion vector predictor index may be defined by different tables. In this case, the affine motion vector predictor index indicates a candidate used for an affine motion prediction, and the non-affine motion vector predictor index indicates a candidate used for an inter prediction.

The decoder may entropy-decode the affine prediction-related syntax element of the current block based on the context index (S1140).

The entropy-decoded affine prediction-related syntax element may be used for an affine motion vector prediction.

Figure 12:
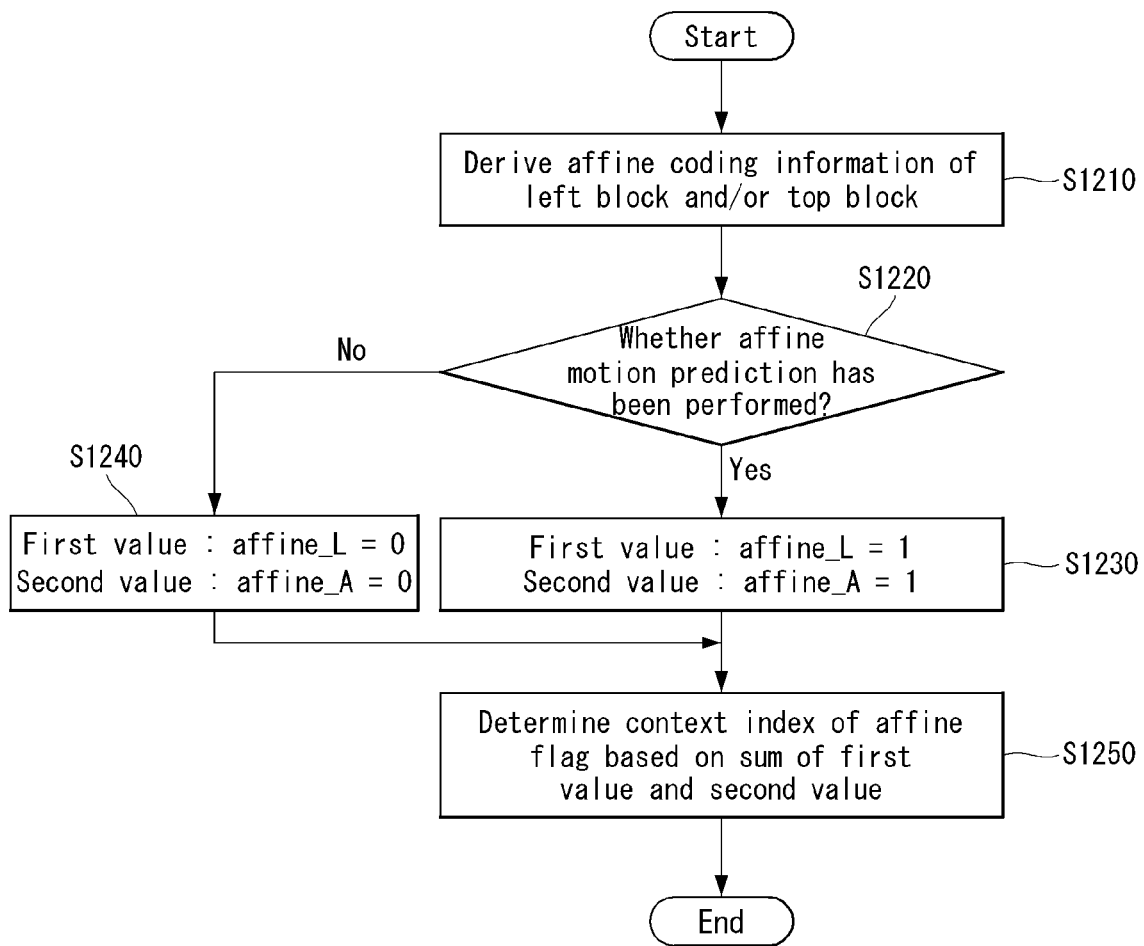
FIG. 12 is an embodiment to which the disclosure is applied, and is a flowchart illustrating a process of determining the context index of an affine flag.

FIG. 12 is an embodiment to which the disclosure is applied, and is a flowchart illustrating a process of determining the context index of an affine flag.

An embodiment of the disclosure proposes a context model for an affine flag (affine_flag). The context model of a current block C is configured with three context models based on affine coding information of a neighboring left block L and top block A. A context index may be determined like Equation 2. In this case, the affine coding information indicates whether an affine motion prediction has been performed.

$$ctx\_idx\_for\_affine\_flag = affine\_L + affine\_A \quad \text{[Equation 2]}$$

In this case, ctx_idx_for affine_flag is a context index for the affine flag (affine_flag), and may have a value of 0~2.

For example, affine_L indicates whether an affine motion prediction has been performed on a left block. affine_A indicates whether an affine motion prediction has been performed on a top block. When an affine motion prediction is performed, affine_L or affine_A have a value of 1. When an affine motion prediction is not performed, affine_L or affine_A has a value of 0.

As the number of neighbor blocks on which an affine motion prediction has been performed increases (i.e., as a ctx_idx_for affine_flag value increases), the probability that a current block will be a block on which an affine motion prediction has been performed is high. Accordingly, each context model may be configured as Table 1.

TABLE 1

| ctx_idx_for_affine_flag | 0 | 1 | 2 |
|---|---|---|---|
| Init_val | $N_0$ | $N_1$ | $N_2$ |

In this case, Init_val indicates an initial value, and indicates a given value that satisfies Equation 3.

$$p(N_0) < p(N_1) < p(N_2) \quad \text{[Equation 3]}$$

In this case, $p(N_0)$, $p(N_1)$, and $p(N_2)$ mean probability values when the affine flag (affine_flag) is true in each initial value.

Accordingly, Equation 3 means that the probability that a current block will be a block on which an affine motion prediction has been performed is high as the number of neighbor blocks on which an affine motion prediction has been performed is increased.

Referring to FIG. 12, the decoder may derive affine coding information of a left block and/or top block of a current block (S1210).

The decoder may check whether an affine motion prediction has been performed on the left block and/or the top block based on the affine coding information (S1220).

When an affine motion prediction is performed on the left block, affine_L may be determined as 1 (first value). When an affine motion prediction is performed on the top block, affine_A may be determined as 1 (second value) (S1230).

In contrast, when an affine motion prediction is not performed on the left block, affine_L may be determined as 0 (first value). When an affine motion prediction is not performed on the top block, affine_A may be determined as 0 (second value) (S1240).

The decoder may determine the context index of an affine flag based on the sum of a first value for the left block and a second value for the top block (S1250).

That is, the decoder may determine the context index of the affine flag based on the sum of affine coding information of the left block and affine coding information of the top block. In this case, the affine flag indicates whether an affine motion prediction has been performed.

As described above, the disclosure can determine a context model more suitable for a current block by determining the context index of a syntax element related to an affine prediction based on affine coding information of a neighbor block, and thus can improve performance of entropy coding/decoding.

Figure 13:
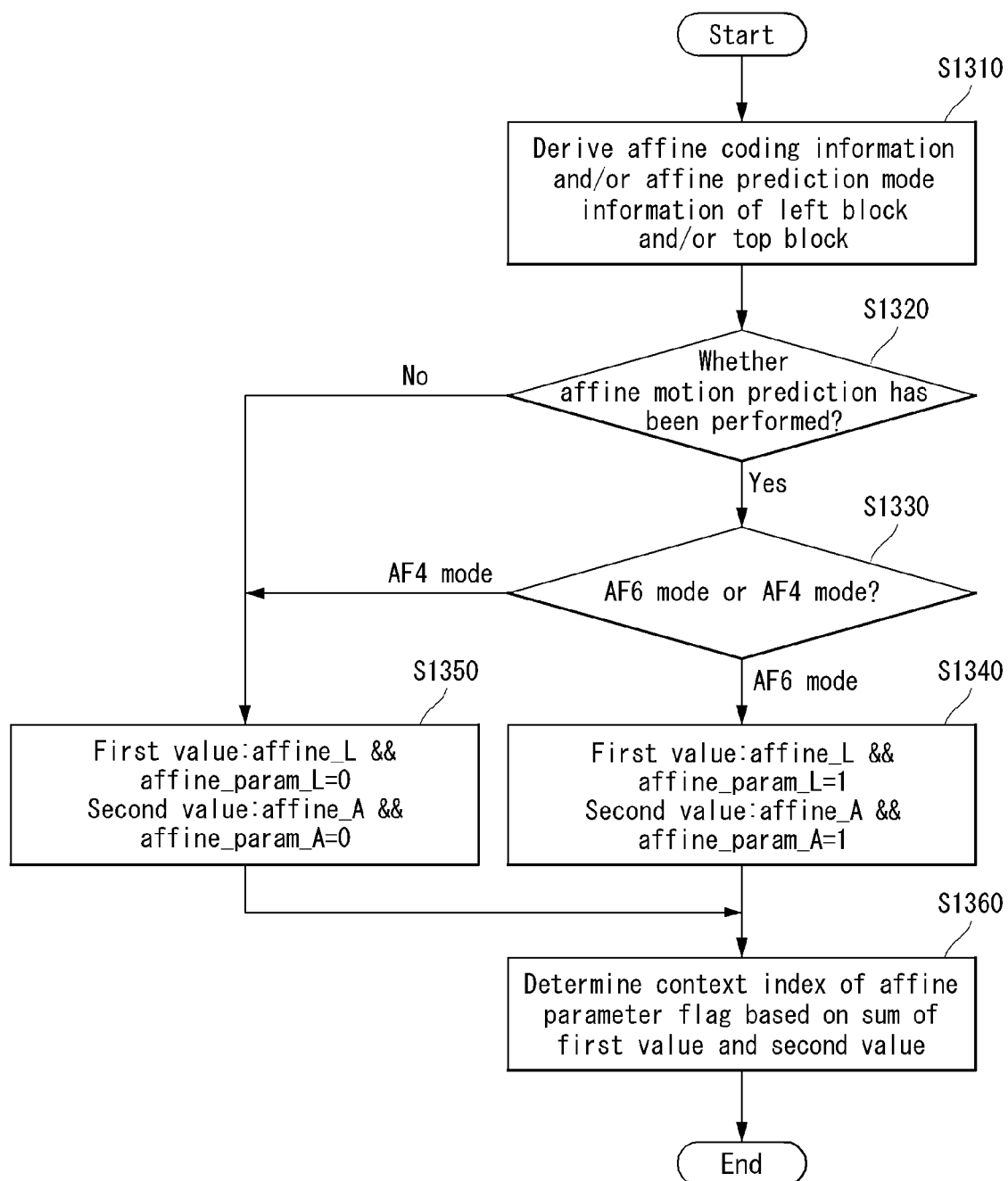
FIG. 13 is an embodiment to which the disclosure is applied, and is a flowchart illustrating a process of determining the context index of an affine parameter flag.

FIG. 13 is an embodiment to which the disclosure is applied, and is a flowchart illustrating a process of determining the context index of an affine parameter flag.

According to an embodiment of the disclosure, when an affine prediction-related syntax element includes an affine parameter flag, the context index of the affine parameter flag may be determined based on the sum of a first value determined by affine coding information and affine prediction mode information of a left block and a second value determined by affine coding information and affine prediction mode information of a top block. In this case, the affine parameter flag is a flag indicating whether an affine motion prediction is performed based on the AF4 mode or the AF6 mode.

Furthermore, the affine coding information is information indicating whether an affine motion prediction has been performed.

The affine prediction mode information is information indicating whether an affine motion prediction is performed based on the AF4 mode or the AF6 mode. In this case, the AF4 mode indicates that an affine motion prediction is performed by four parameters, and the AF6 mode indicates that an affine motion prediction is performed by six parameters.

For another example, the affine prediction mode information may be a flag indicating whether an affine motion prediction is performed based on the AF6 mode. For example, the affine prediction mode information indicates that an affine motion prediction is performed by six parameters when affine_param_flag=1, and indicates that an affine motion prediction is performed by four parameters when affine_param_flag=0.

In the disclosure, a context model for an affine parameter flag (affine_param_flag) is described. The context model of a current block C uses three context models based on the sum of a first value determined by affine coding information and affine prediction mode information of a left block and a second value determined by affine coding information and affine prediction mode information of a top block, and is described like Equation 4.

ctx_idx_for_affine_param_flag=affine_*L*&&
affine_param_*L*+affine_*A*&& affine_param_*A*   [Equation 4]

In this case, ctx_idx_for_affine_param_flag is a context index for an affine parameter flag (affine_param_flag), and may have a value of 0~2.

For example, affine_L indicates whether an affine motion prediction has been performed on a left block. affine_A indicates whether an affine motion prediction has been performed on a top block. affine_L or affine_A has a value of 1 when an affine motion prediction is performed, and affine_L or affine_A has a value of 0 when an affine motion prediction is not performed.

For example, affine_param_L indicates whether an affine motion prediction is performed on a left block based on the AF6 mode. affine_param_A indicates whether an affine motion prediction is performed on a top block based on the AF6 mode. affine_param_L or affine_param_A has a value of 1 when an affine motion prediction is performed based on the AF6 mode, and affine_param_L or affine_param_A has a value of 0 when an affine motion prediction is not performed based on the AF6 mode.

Referring to FIG. 13, the decoder may derive affine coding information and/or affine prediction mode information of a left block and/or top block of a current block (S1310).

The decoder may check whether an affine motion prediction has been performed on the left block and/or the top block based on the affine coding information (S1320).

The decoder may confirm whether an affine motion prediction has been performed based on the AF6 mode or the AF4 mode based on the affine prediction mode information (S1330).

For example, when an affine motion prediction is performed and the affine motion prediction is performed based on the AF6 mode, (first value) affine_L && affine_param_L=1 may be obtained in the case of a left block, and (second value)affine_A && affine_param_A=1 may be obtained in the case of a top block (S1340).

In contrast, when an affine motion prediction is not performed or the affine motion prediction is not performed based on the AF6 mode, (first value) affine_L && affine_param_L=0 may be obtained in the case of a left block, and (second value)affine_A && affine_param_A=0 may be obtained in the case of a top block (S1350).

The decoder may determine the context index of an affine parameter flag based on the sum of the first value and the second value. For example, the context index of the affine parameter flag may have a value of 0~2.

As the number of neighbor blocks on which an affine motion prediction has been performed based on the AF6 mode (i.e., as a ctx_idx_for affine_param_flag value increases), the probability that a current block will be a block on which an affine motion prediction has been performed based on the AF6 mode is high. Accordingly, each context model may be configured as Table 2.

TABLE 2

| ctx_idx_for_affine_param_flag | 0 | 1 | 2 |
|---|---|---|---|
| Init_val | $N_0$ | $N_1$ | $N_2$ |

In this case, Init_val indicates an initial value, and indicates a given value that satisfies Equation 5.

$$p(N_0)<p(N_1)<p(N_2)$$ [Equation 5]

In this case, $p(N_0)$, $p(N_1)$, and $p(N_2)$ mean probability values when an affine parameter flag (affine_param_flag) is true in each initial value.

Accordingly, Equation 5 means that the probability that a current block will be a block on which an affine motion prediction has been performed based on the AF6 mode is high as the number of neighbor blocks on which an affine motion prediction has been performed based on the AF6 mode is increased.

As described above, the disclosure can determine a context model more suitable for a current block by determining the context index of a syntax element related to an affine prediction based on at least one of affine coding information and/or affine prediction mode information of a neighbor block, and thus can improve performance of entropy coding/decoding.

Figure 14:
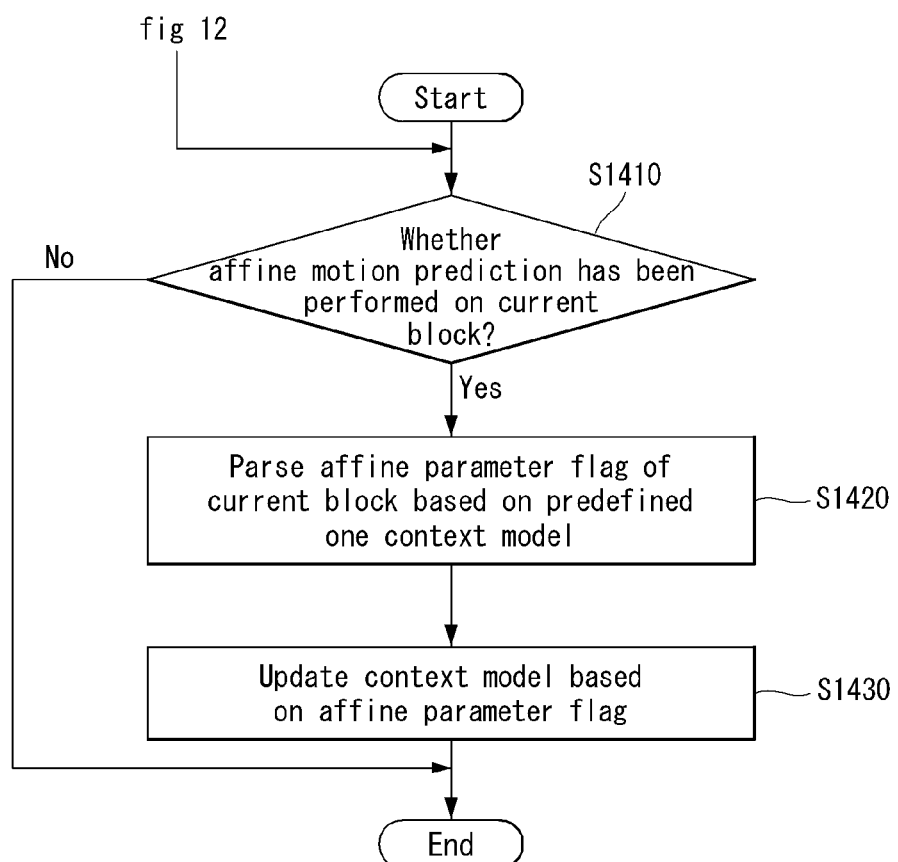
FIG. 14 is an embodiment to which the disclosure is applied and is a flowchart for describing a method using one context model in order to code affine_param_flag.

FIG. 14 is an embodiment to which the disclosure is applied, and is a flowchart for describing a method using one context model in order to code affine_param_flag.

In actual coding/decoding, when the frequency of occurrence of affine_param_flag is very low, if three context models are used, an actual occurrence probability and a probability model may be different. For example, the probability that affine_param_flag occurs may be computed using three context models as in Table 3.

TABLE 3

|    | p(affine_param_flag) | | |
| --- | --- | --- | --- |
| QP | ctx = 0 | 1 | 2 |
| 22 | 37% | 59% | 49% |
| 27 | 42% | 39% | 36% |
| 32 | 41% | 42% | 46% |
| 37 | 42% | 41% | 46% |

In this case, it is difficult to find a tendency according to the three context models and a tendency according to a QP. Accordingly, the disclosure may configure one context model like Table 4. An initial value may be determined as a value having a given probability based on a QP.

TABLE 4

| ctx_idx_for_affine_param_flag | 0 |
| --- | --- |
| Init_val | N |

Referring to FIG. 14, the encoder/decoder may check whether an affine motion prediction has been performed on a current block (S1410). For example, this may be determined by the process of FIG. 12, and a redundant description is omitted.

If the affine motion prediction has been performed on the current block, the encoder/decoder may parse the affine parameter flag of the current block based on a predefined one context model (S1420). In this case, a context index is always 0 because only one context model is used.

The encoder/decoder may update the context model based on the parsed affine parameter flag (S1430).

As described above, a syntax element can be coded/decoded more effectively compared to a case where a plurality of context models is used because only one context model is used.

In another embodiment to which the disclosure is applied, throughput can be improved while maintaining coding performance through CABAC bypass coding of affine_param_flag.

CABAC indicates high coding performance. In contrast, date dependency causes a throughput bottleneck, in particular, in a high bit rate. CABAC may limit the battery lifespan in video coding/decoding because high throughput provides a power reduction. This is very important in the case of a portable device, such as a smartphone. Accordingly, in designing a video coding system, throughput improvements in addition to coding efficiency is a very important factor.

Most of throughput improvements may be performed by the bypass (bypass coding mode) of probability estimation for uniformly distributed bins.

Accordingly, the disclosure provides a method for improving throughput while maintaining coding performance through the bypass coding of affine_param_flag.

Specifically, there is provided a method of using one bin for affine_param_flag and bypass-coding one bin of affine_param_flag.

Test results according to the bypass coding of affine_param_flag according to the disclosure are shown in Table 5.

TABLE 5

|  | Y | U | V |
| --- | --- | --- | --- |
| SDR-UHD | −0.02% | 0.02% | −0.07% |
| SDR-HD | 0.02% | −0.20% | −0.39% |
| Overall | 0.00% | −0.09% | −0.23% |

Furthermore, affine_mvp_idx may be decoded separately from mvd_CPi. This is described in FIG. 15. In this case, in FIG. 15, mvp_idx may be substituted with mvd_CPi in FIG. 17 and applied. In this case, mvd_CPi indicates a motion vector difference of a control point CPi.

FIG. 15 is an embodiment to which the disclosure is applied, and illustrates a syntax structure for an affine motion prediction based on an affine flag.

In the disclosure, a context model for coding mvp_idx is described. As in FIG. 15, a motion vector predictor (MVP) candidate is used in inter coding regardless of whether the MVP candidate has been affine-motion-prediction coded. Accordingly, MVP candidates are not separately used in an affine motion prediction and other inter predictions. Accordingly, the disclosure provides a method using one context model for mvp_idx and an initial value.

The decoder may obtain merge_flag and check whether a merge mode is applied to a current block (S1510).

When the merge mode is not applied to the current block, the decoder may obtain affine_flag (S1520). In this case, affine_flag indicates whether an AF mode is performed.

When the affine_flag=1, that is, an AF mode is applied to the current block, the decoder may obtain affine_param_flag (S1530). In this case, affine_param_flag indicates whether the AF6 mode is performed (or whether the AF4 mode is performed).

Furthermore, the decoder may obtain a motion predictor index (mvp_idx) (S1540). In this case, one context model for mvp_idx and an initial value may be used.

The decoder may obtain a motion predictor based on the motion predictor index (mvp_idx), and may reconstruct a video signal based on the motion predictor.

FIG. 16 is an embodiment to which the disclosure is applied, and illustrates a syntax structure for separately decoding a motion predictor index for an affine prediction and a motion predictor index for an inter prediction.

In the disclosure, a method of designing a CABAC context model by dividing mvp_idx (affine_mvp_idx) for an affine prediction and mvp_idx for a non-affine prediction is described.

In this case, affine_mvp_idx indicates a candidate to be used for an affine prediction among two MVP candidates. For example, a first MVP candidate is used when affine_mvp_idx=0, and a second candidate is used when affine_mvp_idx=1.

mvp_idx indicates a candidate used among two MVP candidates for an inter prediction. For example, a first MVP candidate is used when mvp_idx=0, and a second candidate is used when mvp_idx=1.

Probabilities when mvp_idx=0 according to an affine prediction and a non-affine prediction are shown in Table 6.

TABLE 6

| QP | p(0 | affine) | p(0 | non affine) |
|----|-------------|-----------------|
| 22 | 78% | 91% |
| 27 | 76% | 89% |
| 32 | 73% | 87% |
| 37 | 71% | 85% |

From Table 6, the following facts can be known.

1) A probability distribution of mvp indices according to an affine prediction is different.

2) In the case of P(0|affine), the probability is decreased as a QP is increased. In this case, P(0|affine) indicates a probability when mvp_idx=0 according to an affine prediction.

3) In the case of P(0|non affine), the probability is increased as the QP is increased. In this case, P(0|non affine) indicates a probability when mvp_idx=0 according to a non-affine prediction.

Accordingly, the disclosure proposes separately decoding mvp indices based on whether an affine prediction is performed.

The decoder may check whether a merge mode is applied to a current block by obtaining merge_flag (S1610).

When the merge mode is not applied to the current block, the decoder may obtain affine_flag (S1620). In this case, affine_flag indicates whether an AF mode is performed.

When the affine_flag=1, that is, the AF mode is applied to the current block, the decoder may obtain affine_param_flag and affine_mvp_idx (S1630, S1640). In this case, affine_param_flag indicates whether the AF6 mode is performed (or whether the AF4 mode is performed). affine_mvp_idx indicate an affine motion vector predictor index.

In contrast, when the affine_flag=0, the decoder may obtain mvp_idx (S1650). In this case, mvp_idx means a motion predictor index for an inter prediction.

The decoder may obtain a motion predictor based on the affine motion vector predictor index or the motion predictor index for an inter prediction, and may reconstruct a video signal based on the motion predictor.

In another embodiment, Table 7 and Table 8 illustrate context models of affine_mvp_idx and mvp index and initial values thereof, respectively.

TABLE 7

| affine_mvp_idx | 0 |
|----------------|---|
| Init_val | $N_{affine\_mvp\_idx}$ |

TABLE 8

| mvp_idx | 0 |
|---------|---|
| Init_val | $N_{mvp\_idx}$ |

As in Table 7, an initial value Naffine_mvp_idx of affine_mvp_idx may be determined as a value having a probability that affine_mvp_idx is 0 is decreased as a QP is increased.

Furthermore, as in Table 8, an initial value Nmvp_idx of mvp_idx may be determined as a value having a probability that mvp_idx is 0 is decreased as a QP is increased.

Figure 17:
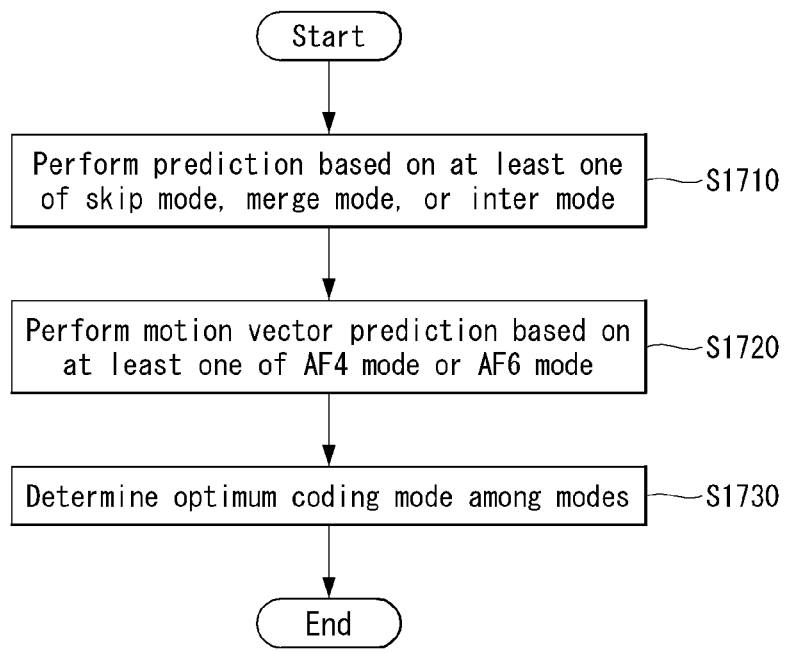
FIG. 17 is an embodiment to which the disclosure is applied, and illustrates a flowchart for adaptively determining an optimum coding mode based on at least one of an AF4 mode or an AF6 mode.

FIG. 17 is an embodiment to which the disclosure is applied, and illustrates a flowchart for adaptively determining an optimum coding mode based on at least one of an AF4 mode or an AF6 mode.

A video signal processing apparatus may perform a prediction based on at least one of a skip mode, a merge mode or an inter mode (S1710). In this case, the merge mode may include the aforementioned AF merge mode in addition to a common merge mode. The inter mode may include the aforementioned AF inter mode in addition to a common inter mode.

The video signal processing apparatus may perform a motion vector prediction based on at least one of the AF4 mode or the AF6 mode (S1720). In this case, step S1710 and step S1720 are not limited to their sequence thereof.

The video signal processing apparatus may determine an optimum coding mode of the modes by performing a comparison on the results of step S1720 (S1730). In this case, the results of step S1720 may be compared based on a rate-distortion cost.

Thereafter, the video signal processing apparatus may generate the motion vector predictor of a current block based on the optimum coding mode, and may obtain a motion vector difference by subtracting the motion vector predictor from the motion vector of the current block.

Thereafter, the encoding/decoding process described in FIGS. 1 and 2 may be identically applied.

FIG. 18 is an embodiment to which the disclosure is applied, and illustrates a syntax structure for performing decoding based on the AF4 mode or the AF6 mode.

The decoder may check whether a merge mode is applied to a current block by obtaining merge_flag (S1810).

When the merge mode is not applied to the current block, the decoder may obtain affine_flag (S1820). In this case, affine_flag indicates whether an AF mode is performed.

When the affine_flag=1, that is, the AF mode is applied to the current block, the decoder may obtain affine_param_flag (S1830). In this case, affine_param_flag indicates whether the AF4 mode is performed (also indicates whether an affine motion prediction is performed by four parameters).

When the affine_param_flag=0, that is, when a motion vector prediction is performed based on the AF4 mode, the decoder may obtain mvd_CP0 and mvd_CP1, that is, a difference between two motion vectors (S1840). In this case, mvd_CP0 indicates a motion vector difference for a control point 0, and mvd_CP1 indicates a motion vector difference for a control point 1.

Furthermore, when the affine_param_flag=1, that is, when a motion vector prediction is performed based on the AF6 mode, the decoder may obtain mvd_CP0, mvd_CP1 and mvd_CP2, that is, three motion vector differences (S1850).

Figure 19:
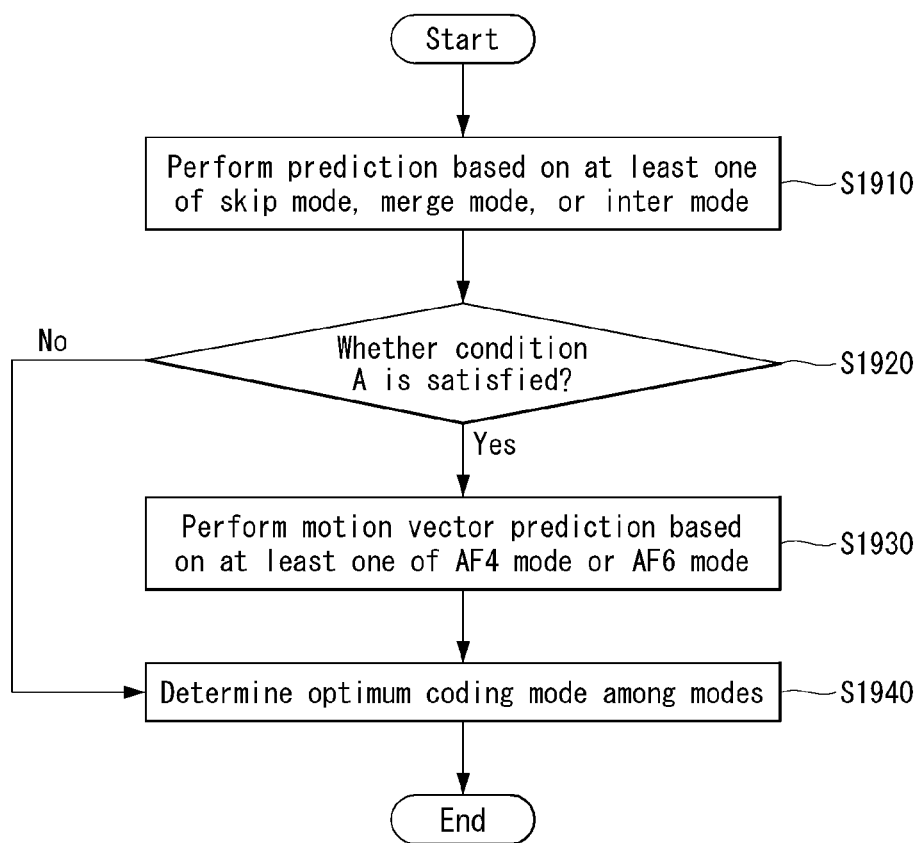
FIG. 19 is an embodiment to which the disclosure is applied, and illustrates a flowchart for adaptively determining an optimum coding mode among motion vector prediction modes, including the AF4 mode or the AF6 mode, based on a condition A.

FIG. 19 is an embodiment to which the disclosure is applied, and illustrates a flowchart for adaptively determining an optimum coding mode among motion vector prediction modes, including the AF4 mode or the AF6 mode, based on a condition A.

The encoder may perform a prediction based on at least one of a skip mode, a merge mode or an inter mode (S1910).

The encoder may confirm whether a condition A for a current block is satisfied in order to determine an optimum coding mode fora motion vector prediction (S1920).

In this case, the condition A may mean a condition for a block size. For example, the condition A indicates whether the pixel number (pixNum) of a current block is greater than a threshold TH1. Alternatively, the condition A indicates whether both the width and height of the current block is greater than the threshold TH1. Alternatively, the condition A indicates whether the width of the current block is greater than the threshold TH1 or the height of the current block is greater than the threshold TH1.

When the condition A is satisfied, the encoder may perform a motion vector prediction based on at least one of the AF4 mode or the AF6 mode (S1930).

The encoder may determine an optimum coding mode among motion vector prediction modes, including the AF4 mode or the AF6 mode, by performing a comparison on the results of step S1910 and S1930 (S1940).

Meanwhile, when the condition A is not satisfied, the encoder may determine an optimum coding mode among modes not an AF mode (S1940).

Thereafter, the encoder may generate the motion vector predictor of the current block based on the optimum coding mode, and may obtain a motion vector difference by subtracting the motion vector predictor from the motion vector of the current block.

Thereafter, the encoding/decoding process described in FIGS. 1 and 2 may be identically applied.

Figure 20:
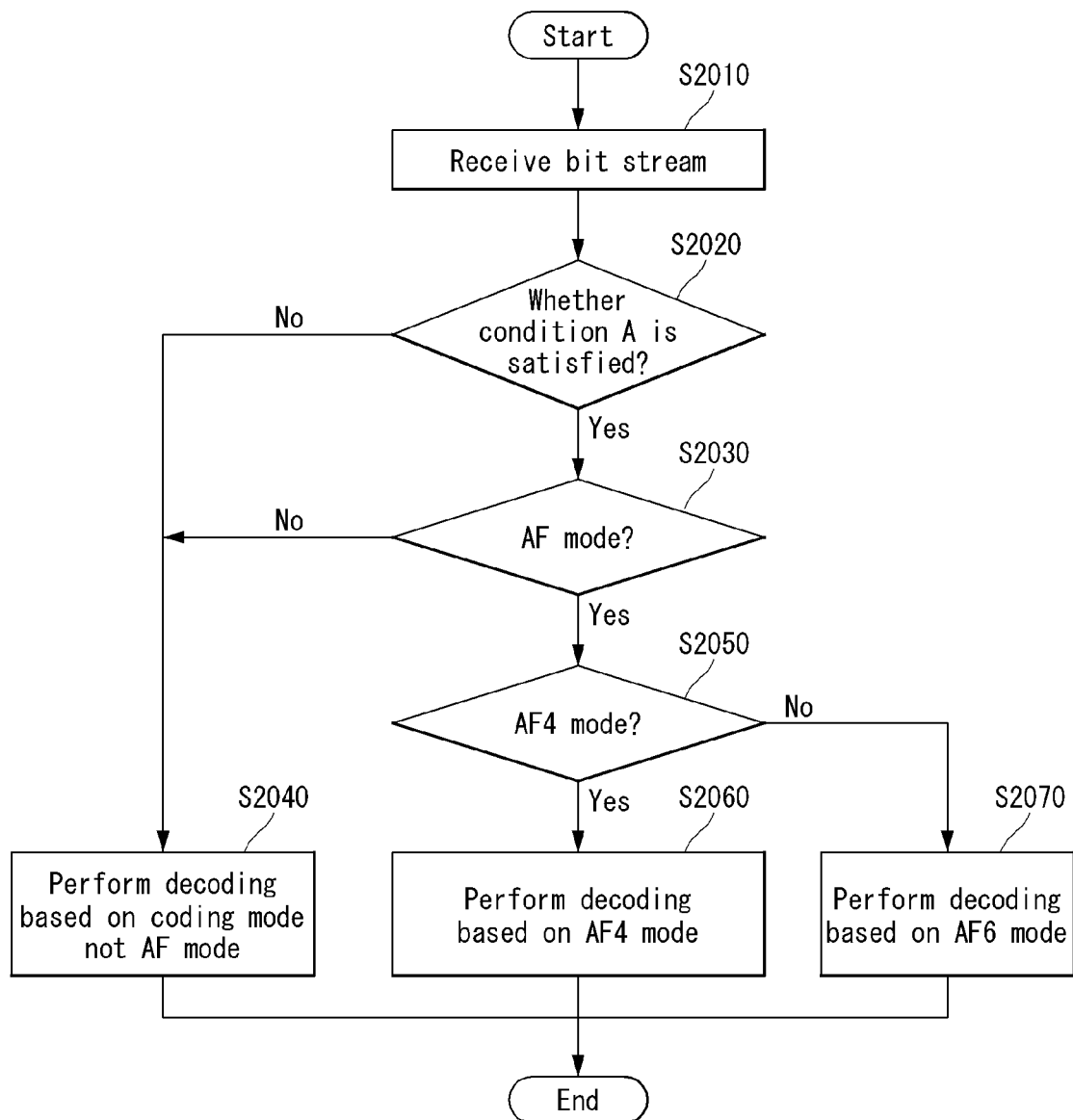
FIG. 20 is an embodiment to which the disclosure is applied, and illustrates a flowchart for adaptively performing decoding based on the AF4 mode or the AF6 mode based on the condition A.

FIG. 20 is an embodiment to which the disclosure is applied, and illustrates a flowchart for adaptively performing decoding based on the AF4 mode or the AF6 mode based on the condition A.

The decoder may receive a bitstream (S2010). The bitstream may include information on a coding mode of a current block within a video signal.

The decoder may confirm whether a condition A for a current block is satisfied in order to determine an optimum coding mode for a motion vector prediction (S2020). In this case, the condition A may mean a condition for a block size. For example, the embodiments of FIG. 18 may be applied.

When the condition A is satisfied, the decoder may confirm whether a coding mode of the current block is an AF mode (S2030). In this case, the AF mode means an affine motion prediction mode using an affine motion model, and the embodiments described in the disclosure may be applied to the AF mode.

In this case, step S2030 may be confirmed by an affine flag indicating whether the AF mode is performed. For example, the affine flag may be represented as affine_flag. The affine flag indicates that the AF mode is applied to the current block when the affine_flag=1, and indicates that the AF mode is not applied to the current block when the affine_flag=0.

When the condition A is not satisfied or the AF mode is not applied to the current block, the decoder may perform decoding (i.e., motion vector prediction) based on a coding mode not the AF mode (S2040). For example, a skip mode, a merge mode or an inter mode may be used.

When the AF mode is performed on the current block, the decoder may check whether the AF4 mode is applied to the current block (S2050).

In this case, step S1950 may be checked by an affine parameter flag indicating whether the AF4 mode is performed (also indicates whether an affine motion prediction is performed by four parameters). For example, the affine parameter flag may be represented as affine_param_flag. The affine parameter flag may mean that a motion vector prediction is performed based on the AF4 mode when the affine_param_flag=0 (S2060), and a motion vector prediction is performed based on the AF6 mode when the affine_param_flag=1 (S2070), but the disclosure is not limited thereto.

Figure 21:
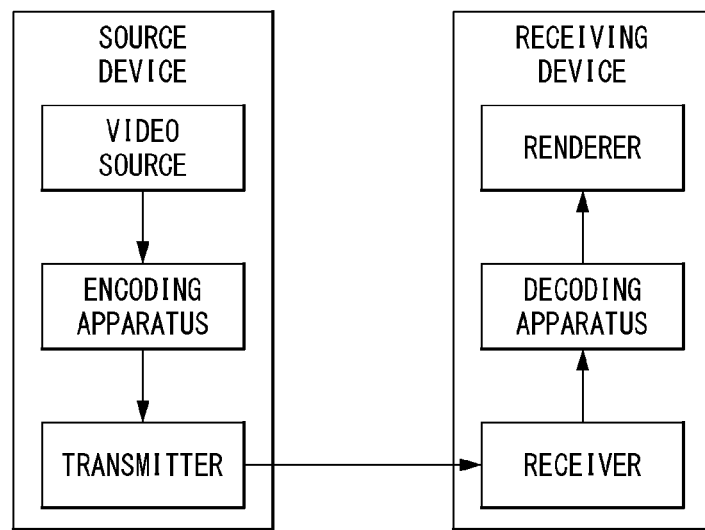
FIG. 21 illustrates a video coding system to which the disclosure is applied.

FIG. 21 illustrates a video coding system to which the disclosure is applied.

The video coding system may include a source device and a receiving device. The source device may transmit, to the receiving device, encoded video/image information or data through a digital storage medium or over a network in a file or streaming form.

The source device may include a video source, an encoding apparatus, and a transmitter. The receiving device may include a receiver, a decoding apparatus and a renderer. The encoding apparatus may be called a video/image encoding apparatus. The decoding apparatus may be called a video/image decoding apparatus. The transmitter may be included in the encoding apparatus. The receiver may be included in the decoding apparatus. The renderer may include a display. The display may be configured for each device or external component.

The video source may obtain a video/image through the capture, synthesis or generation process of a video/image. The video source may include a video/image capture device and/or a video/image generation device. The video/image capture device may include one or more cameras, a video/image archive including a previously captured video/image, etc., for example. The video/image generation device may include a computer, a tablet and a smartphone, for example, and may (electronically) generate a video/image. For example, a virtual video/image may be generated through a computer. In this case, a process of generating related data may be substituted with a video/image capture process.

The encoding apparatus may encode an input video/image. The encoding apparatus may perform a series of procedures, such as a prediction, a transform, quantization, and entropy encoding, for compression and coding efficiency. The encoded data (encoded video/image information) may be output in a bitstream form. In this case, in performing the entropy encoding, the embodiments of the disclosure may be applied.

The transmitter may transmit, to the receiver of the receiving device, encoded video/image information or data output in a bitstream form through a digital storage medium or over a network in a file or streaming form. The digital storage medium may include various storage media, such as a USB, an SD, a CD, a DVD, Blu-ray, an HDD, and an SSD. The transmitter may include an element for generating a media file through a predefined file format, and may include an element for transmission over a broadcast/communication network. The receiver may extract the bitstream and transmit it to the decoding apparatus.

The decoding apparatus may decode a video/image by performing a series of procedures, such as entropy decoding, de-quantization, an inverse transform, and a prediction corresponding to operations of the encoding apparatus. In this case, in performing the entropy decoding, the embodiments of the disclosure may be applied.

The renderer may render a decoded video/image. The rendered video/image may be displayed through a display.

Figure 22:
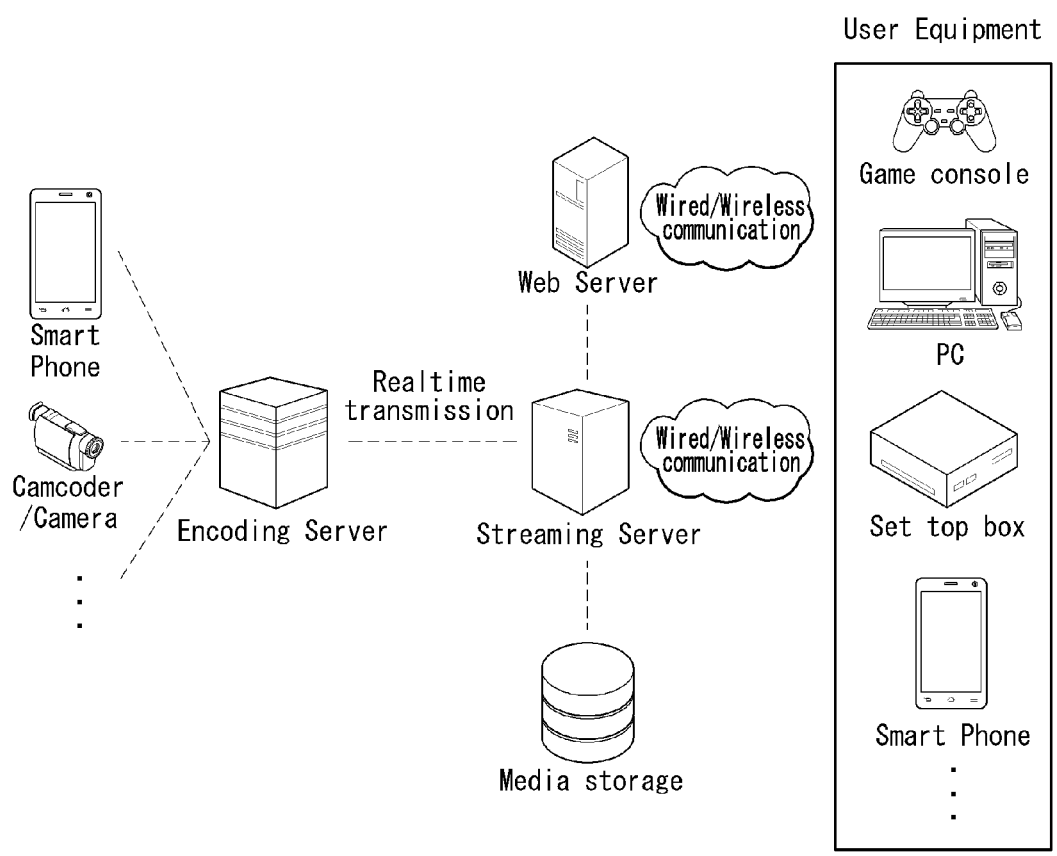
FIG. 22 illustrates a content streaming system to which the disclosure is applied.

FIG. 22 illustrates a content streaming system to which the disclosure is applied.

Referring to FIG. 22, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented in a computer, processor, micro-processor, controller or chip and performed. For example, the function units shown in drawings of the present application may be implemented in a computer, processor, micro-processor, controller or chip and performed.

As described above, the decoder and the encoder to which the disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the disclosure is applied may be produced in the form of a program that is to be executed by a computer and may be stored in a computer-readable recording medium. Multimedia data having a data structure according to the disclosure may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

The exemplary embodiments of the disclosure have been disclosed for illustrative purposes, and those skilled in the art may improve, change, replace, or add various other embodiments within the technical spirit and scope of the disclosure disclosed in the attached claims.

The invention claimed is:

1. An apparatus of decoding a video signal including a current block, the apparatus comprising:
   at least one processor; and
   at least one memory connected to the at least one processor and storing instructions that, when executed by the at least one processor, perform operations comprising:
   deriving affine coding information of a left block and/or a top block of the current block, wherein the affine coding information includes an affine flag indicating whether an affine motion prediction has been performed,
   determining a context index of the affine flag of the current block based on the affine coding information of at least one of the left block and/or the top block,
   entropy decoding the affine flag of the current block based on the context index,
   parsing an affine parameter flag representing whether 4 parameters or 6 parameters are used for an affine motion model based on the affine flag of the current block,
   obtaining a motion vector predictor based on the 4 parameters or the 6 parameters being used for the affine motion model, and
   performing a prediction for the current block based on the motion vector predictor,
   wherein the context index of the affine flag of the current block is determined based on a sum of the affine coding information of the left block and the affine coding information of the top block.

2. The apparatus of claim 1,
   wherein the affine parameter flag is obtained based on a merge flag representing that motion parameters are not inferred from a neighboring block.

3. The apparatus of claim 1,
   wherein the affine flag is obtained based on a width and a height of the current block are equal or greater than a predetermined value.

4. The apparatus of claim 1,
   wherein a context index of the affine parameter flag is determined based on a sum of a first value determined by the affine coding information and affine prediction mode information of the left block and a second value determined by the affine coding information and affine prediction mode information of the top block.

5. An apparatus of encoding a video signal including a current block, the apparatus comprising:
   at least one processor; and
   at least one memory connected to the at least one processor and storing instructions that, when executed by the at least one processor, perform operations comprising:
   generating a motion vector predictor based on 4 parameters or 6 parameters being used for an affine motion model,
   performing a prediction for the current block based on the motion vector predictor,
   generating an affine flag representing whether an affine motion prediction has been performed, generating an affine parameter flag representing whether the 4 parameters or the 6 parameters are used for the affine motion model, deriving affine coding information of a left block and/or a top block of the current block, wherein the affine coding information includes the affine flag, determining a context index of the affine flag of the current block based on the affine coding information of at least one of the left block and/or the top block, and entropy encoding the affine flag of the current block based on the context index, wherein the context index of the affine flag of the current block is determined based on a sum of the affine coding information of the left block and the affine coding information of the top block.

6. The apparatus of claim 5, wherein the affine parameter flag is generated based on a merge flag representing that motion parameters are not inferred from a neighboring block.

7. The apparatus of claim 5, wherein the affine flag is generated based on a width and a height of the current block are equal or greater than a predetermined value.

8. The apparatus of claim 5, wherein a context index of the affine parameter flag is determined based on a sum of a first value determined by the affine coding information and affine prediction mode information of the left block and a second value determined by the affine coding information and affine prediction mode information of the top block.

9. An apparatus of transmitting data for an image, comprising:

a transmitter;

at least one processor; and at least one memory connected to the at least one processor and storing instructions that, when executed by the at least one processor, perform operations comprising:

obtaining a bitstream for the image; and transmitting, via the transmitter, the data comprising the bitstream, wherein the operations further comprise:

generating a motion vector predictor based on 4 parameters or 6 parameters being used for an affine motion model, performing a prediction for the current block based on the motion vector predictor, generating an affine flag representing whether an affine motion prediction has been performed, generating an affine parameter flag representing whether the 4 parameters or the 6 parameters are used for the affine motion model, deriving affine coding information of a left block and/or a top block of the current block, wherein the affine coding information includes the affine flag, determining a context index of the affine flag of the current block based on the affine coding information of at least one of the left block and/or the top block, and entropy encoding the affine flag of the current block based on the context index, wherein the context index of the affine flag of the current block is determined based on a sum of the affine coding information of the left block and the affine coding information of the top block.

* * * * *